United States Patent [19]

Suzuki et al.

[11] Patent Number: 5,579,705
[45] Date of Patent: Dec. 3, 1996

[54] PLASMA FURNACE AND A METHOD OF OPERATING THE SAME

[75] Inventors: Tomio Suzuki; Yasuo Higashi; Shigeyoshi Tagashira, all of Kobe; Motoo Yamada, Amagasaki, all of Japan

[73] Assignees: Kabushiki Kaisha Kobe Seiko Sho, Kobe; Kansai Denryoku Kabushiki Kaisha, Osaka, both of Japan

[21] Appl. No.: 556,022

[22] Filed: Nov. 13, 1995

Related U.S. Application Data

[62] Division of Ser. No. 325,433, filed as PCT/JP94/00362 on Mar. 8, 1994.

[30] Foreign Application Priority Data

| Mar. 8, 1993 | [JP] | Japan | 5-75199 |
| Mar. 8, 1993 | [JP] | Japan | 5-75200 |
| Mar. 11, 1993 | [JP] | Japan | 5-78757 |
| Apr. 12, 1993 | [JP] | Japan | 5-109919 |
| Apr. 12, 1993 | [JP] | Japan | 5-109920 |
| Apr. 23, 1993 | [JP] | Japan | 5-120790 |
| May 18, 1993 | [JP] | Japan | 5-31300 |

[51] Int. Cl.$^6$ .................................................. F23N 5/00
[52] U.S. Cl. ........................ 110/185; 110/210; 75/10.19
[58] Field of Search .................................. 110/266, 238, 110/210, 212, 185, 186, 189; 432/161; 75/10.19, 10.2, 10.21, 10.22; 266/144

[56] References Cited

U.S. PATENT DOCUMENTS

| 4,380,469 | 4/1983 | Sulzbacher | 75/10.22 |
| 4,518,417 | 5/1985 | Lugscheider et al. | 75/10.19 |
| 4,756,748 | 7/1988 | Lu et al. | 75/10.22 |
| 5,057,466 | 10/1991 | Sugiyama et al. | 501/135 |
| 5,107,517 | 4/1992 | Lauren | 373/18 |
| 5,370,724 | 12/1994 | Bitler et al. | 75/10.19 |

*Primary Examiner*—Thomas E. Denion
*Attorney, Agent, or Firm*—Oblon, Spivak, McClelland, Maier & Neustadt, P.C.

[57] ABSTRACT

The flow of waste gas is directed downwardly by means of a refractory guide chute so as to follow the down flow of molten slag at the downstream end of a slag outlet. Thus the sensible heat of the high-temperature waste gas forcedly heats the molten slag and the downstream end portion of the slag outlet. Consequently, it becomes less possible for the slag outlet to be choked up. When there are signs that the slag outlet is being choked up, the plasma torch is slightly tilted to the upstream end of the slag outlet so as to stabilize the discharge of the molten slag. A housing or jacket is disposed circumferentially around an incineration residue feed pipe, inserted through the incineration residue inlet, and adapted to allow an annular gas curtain to issue therefrom. Fuel injection against the waste gas in the furnace body is particularly suitable for decreasing the amount of NOx. Valuable matter is efficiently recovered from the waste gas without causing a waste gas channel in a waste gas purifying plant to be choked up with the particles of valuable matter. A device for detecting the leakage of cooling water caused by the deterioration of the plasma torch is also provided.

3 Claims, 21 Drawing Sheets

FIG. 21

| First comparator means 6 0 7 | Second comparator means 6 0 8 | Discriminating means 6 0 9 |
|---|---|---|
| Abnormal | Voltage drop | Break circuit |
| Abnormal | No voltage drop | Alarm lamp |
| Normal | No voltage drop | Continue |

PLASMA FURNACE AND A METHOD OF OPERATING THE SAME

This is a division of application Ser. No. 08/325,433 filed on Nov. 23, 1994, which was filed as International Appln. PCT/JP94/00362 on Mar. 8, 1994.

FIELD OF THE INVENTION

The present invention relates to a plasma furnace in which waste such as municipal refuse, shredded and compressed jalopies, sludge or the incineration residue of these kinds of waste is melted by a plasma arc struck from a-plasma torch and converted into slag. The invention also relates to a method of operating the same.

In particular the invention concerns itself with the art of melting the slag efficiently, allowing it to be discharged from the furnace at a constant rate, and keeping waste gas as clean as possible.

BACKGROUND OF THE INVENTION

In recent years, environmental conservation and the recycling of resources are becoming the objects of public attention. Especially, municipal refuse and industrial waste are showing a yearly increase in quantity to such an extent that, within and outside large cities, it is becoming difficult to find out a new site to be filled up with these kinds of waste in a raw state. Therefore, it is common to incinerate these kinds of waste and reduce the volume thereof before taking them to a site to be filled up therewith.

However, there are many cases where municipal refuse and industrial waste contain metals and various kinds of harmful matter, which remain in the ashes and incombustibles (hereinafter called the "incineration residue") after incineration. Underground water will be polluted if a site is filled up with such incineration residue. Another trouble is that, since incineration residue has low specific gravity, an open pit to be filled up therewith must have a large capacity. Furthermore, soft ground results from incineration residue with which a site is filled up, and this soft ground hardly has utility value.

A previously proposed arrangement for eliminating these various difficulties is characterized in melting the incineration residue by a plasma arc and then cool it for solidification. Heavy metals such as chromium are sealed in the solidified slag and prevented from penetration therethrough outwardly thereof. Therefore, underground water is not polluted when a site is filled up with such slag. It will not only turn out to be a contribution to the recycling of resources to use this slag as aggregate to be mixed with concrete or as material for roadbed, but also relieve those skilled in the art of their anxiety about finding out a new site to be filled up with this slag.

For example, Japanese Laid Open Patent Application No. 3=55411 describes a plasma furnace for melting the incineration residue by a plasma arc. This plasma furnace includes a furnace body having a chamber for allowing molten slag to stay. The chamber is provided with an incineration residue inlet and a slag outlet. This plasma furnace further includes a plasma torch for striking a plasma arc. In operation, the incineration residue is fed through the incineration residue inlet and melted by the plasma arc. Molten slag is allowed to stay in the chamber of the furnace body, except that a portion of the molten slag is allowed to continuously leave the chamber through the slag outlet so as to be cooled and solidified. In case of an ordinary furnace designed for use in melting metals, it is most common to dispose a plasma torch at the center of the cylindrical furnace. In case of a plasma furnace described in British Patent Specification No. 1,390,351/3, the plasma torch is swung about its pivot disposed at the center of the furnace. In case of a plasma furnace described on pages 170 and 171 of the Research Paper Vol. 41, No. 2, 1985 published by Tohoku University Dressing and Smelting Laboratory, the plasma torch remains tilted while it revolves round the center of the furnace so that a large area within the furnace designed for use in the direct reduction of chromite ores may be uniformly heated.

Incineration residue to be melted in a plasma furnace of the kind indicated above has a grain size of several microns at the most. Dispersion of pulverulent incineration residue into ambient air is apt to occur when such incineration residue is being fed to the furnace or is about to be melted in the furnace. In order to confine any such dispersion, it is most common to place the incineration residue under the influence of negative pressure caused by an induced draft fan in the direction of flow of the incineration residue through the furnace.

Waste gas discharged from a plasma furnace has a temperature approximating 1300° C. Therefore, a flue to be passed by this waste gas is lined with refractory material. After passage through this flue, the waste gas is quenched in a cooler such as a water spray cooling chamber, allowed to pass through a dust catcher, and discharged into the open air. There are some cases where a heat exchanger is connected to the flue for the recovery of waste heat.

FIGS. 22(a) and 22(b) are sectional views to help explain the structural construction of plasma torches generally used in plasma furnaces of the kind indicated above. Each of these plasma torches comprises an anode 651, a cathode 652, a water jacket 653 and a plasma gas inlet 655. These plasma torches are intended for two modes of operation respectively, the difference therebetween being derived from the difference in where the cathode is disposed. One of the two modes of operation, i.e. the nontransfer mode, is shown in FIG. 22(a), in which a plasma arc 654 is struck between the anode 651 disposed in the plasma torch and the cathode 652 disposed on the lower end of the plasma torch. The other of the two modes of operation, i.e. the transfer mode, is shown in FIG. 22(b), in which the plasma arc 654 is struck between the anode 651 disposed in the plasma torch and the cathode 652 disposed on a furnace body. A plasma gas supply pipe (not shown) is connected to the plasma gas inlet 655.

In case of the former mode of operation, the plasma arc is struck between two portions of the plasma torch. In case of the latter mode of operation, two portions between which the plasma arc is struck are disposed on the furnace body and the plasma torch respectively. Plasma is an ionized gas having a temperature ranging from 3,000 to 10,000K. This temperature is high enough to cause damage to the plasma torch. The severest damage is done to the above-mentioned two portions, while the second severest damage is done to a portion of the plasma torch disposed medially of these two portions. Therefore, the provision of the water jacket 553 results from priority given to the anode 651 and its vicinity in providing a means for preventing the plasma torch from sustaining damage caused by intense heat.

A plasma arc having a temperature up to 10,000K facilitates the decomposition of harmful matter such as dioxine. A small-sized waste-gas purifying plant meets the need of a plasma furnace, because the amount of waste gas discharged from the plasma furnace is less than one-thirtieth of the amount of waste gas discharged from a combustion furnace.

However, each of the prior art plasma furnaces has the disadvantages that, when it is used for melting the waste, the slag outlet is apt to be choked up, that a portion of the waste is discharged through the slag outlet in an unmelted state, and that waste gas discharged from the prior art plasma furnace contains nitrogen oxides ($NO_x$) and heavy metals. These disadvantages pose the following problems:

First Problem

Slag is apt to be cooled and solidified at the slag outlet when the prior art plasma furnace is used for melting incineration residue and when the slag is allowed to continuously leave the furnace through the slag outlet. Solidified slag chokes up the slag outlet port.

It has been proposed to dispose an auxiliary burner or an auxiliary plasma arc at the slag outlet so that solidified slag may be heated again. However, the provision of such auxiliary equipment leads to a complication of the construction.

A previously proposed arrangement for preventing the slag outlet from being choked up is typified by the one disclosed and claimed in the Japanese Laid Open Patent Application No. 1-273908, wherein incineration residue resulting from the incineration of municipal refuse is melted by a plasma arc. Molten slag is adapted to be filled into a sump provided in a bottom section. A slag outlet consisting of a downward nozzle having a divergent lower end is provided in the bottom brick. An overflow weir is interposed between the sump and the slag outlet and is formed, at its side remote from an incineration residue inlet, with a plurality of grooves or channels. A waste gas outflow port is provided at the top of the furnace. The trouble is that the slag outlet is disposed in the bottom section where the temperature is higher than any other sections and that the overflow weir is disposed within the furnace. This construction poses a problem as to whether or not the overflow weir has sufficient structural strength. If it is melted or otherwise broken, molten slag in the sump will flow out in a moment and jeopardize the workers.

Second Problem

A plasma flame becomes unstable and an electric power consumption rate is aggravated when a large-sized plasma furnace having an output power of 1 MW or more and an inner dimension of 1.5 m or more is operated in the transfer mode, i.e. with a high thermal efficiency. If this plasma furnace is of reversed polarity type, molten slag is the negative electrode and a plasma torch is the positive electrode. Voltage control under the condition of a constant current is effected by adjusting the distance from the molten slag to the plasma torch. Output power is thereby adjusted.

In this case, the distance from the molten slag to the plasma torch is about 10 to 30 cm. If one disposes the plasma torch right over the slag outlet on the basis of consideration given to the expansion of the plasma arc, he will have to apprehend that the slag outlet and its vicinity will be subjected to local heating and that refractory material will be melted thereby. If the radiation field of the plasma arc is moved in the direction opposite to the slag outlet, the large obliquity resulting therefrom will cause a double-arc phenomenon with one of the two plasma arcs struck from the outer surface of the plasma torch. This phenomenon is especially apt to occur when the waste to be melted contains a large quantity of matter which is easily blown about. When the plasma torch is tilted in this manner, it is necessary to bring the outer surface thereof close to the surface of the molten slag for the purpose of voltage control. This means that a major portion of the plasma torch has to be projected into the furnace body at the sacrifice of an increase in cooling loss sustained by the plasma torch.

Japanese Laid Open Patent Application No. 3-55411 is directed to overcoming one or more of the problems as set forth above. A plasma furnace disclosed therein comprises a plasma torch for striking a plasma arc therefrom, a driving device for moving the plasma torch in its axial direction, and a tilting device for changing the inclination of the plasma torch so as to change the direction of radiation from the plasma torch. By actuating the tilting device, the direction of the plasma torch can be changed so that the radiation field of the plasma arc may come to include a slag outlet.

The object of providing a plasma torch adapted to be tilted about its pivot so that the radiation field of the plasma arc may range from the surface of the molten slag to the upstream end of the slag outlet is asserted to be to prevent the operation of the plasma furnace from being compelled to be suspended because of the slag which would be cooled and solidified at the slag outlet and thereby would choke up the slag outlet port if it were not for the tiltable plasma torch. The tiltable plasma torch, which should preferably be disposed right over the upstream end of the slag outlet, is capable of directly heating the slag in the slag outlet so as to prevent it from being cooled and allow it to continuously leave the furnace.

However, such a previously proposed disposition of the plasma torch is not necessarily preferable from the standpoint of melting the waste but will cause instability in the melting of the waste, because the slag in the vicinity of the waste inlet will remain at the lowest temperature and, in certain circumstances, the waste in an unmelted state will accumulate under the downstream end of the waste inlet. Instability in the melting of the waste will be especially remarkable when the plasma furnace is operated with a high thermal efficiency and a minimized electric power consumption rate.

Third Problem

Incineration residue is apt to pass through a plasma furnace without being filled into a chamber of the furnace body if the plasma furnace is of the kind provided with an induced draft fan which places the incineration residue under the influence of negative pressure in the direction of flow of the incineration residue through the furnace. Efficiency in converting the incineration residue into slag will be deteriorated thereby. Furthermore, the incineration residue will accumulate in a slag outlet and a flue communicating therewith. These drawbacks incidental to the plasma furnace of this kind will limit its utility.

Fourth Problem

Since a plasma arc has a high temperature, a large amount of $NO_x$ is produced. Especially when air is used as plasma gas, the concentration of $NO_x$ amounts to thousands of ppm.

In order to decrease the amount of $NO_x$, Japanese Laid Open Patent Application No. 2-122109 proposes to add carbonaceous matter such as coke, coal, charcoal, combustible refuse and sludge to the incineration residue and then to melt a mixture of the carbonaceous matter and the incineration residue at a high temperature and in a reducing atmosphere in a plasma furnace.

It is necessary to keep the furnace atmosphere constantly reducing in order to decrease the amount of $NO_x$ by the above-mentioned method. A large quantity of carbonaceous matter is required for keeping the furnace atmosphere constantly reducing. Coke, coal and charcoal are amorphous solids, some of which are heated, melted and gasified after coming into contact with molten slag, while others are gasified as soon as they are dropped into the furnace. Such a difference in the rate of gasification makes it difficult to stabilize the quantity of the reducing gas to be produced per unit time. This is the very reason why a large quantity of carbonaceous matter is required for keeping the furnace atmosphere constantly reducing.

The provision of a means for feeding the amorphous solids to the furnace will result in high installation costs, and yet it will be difficult to subject the feed of amorphous solids to quantitative regulation. Furthermore, it is difficult to put the furnace in a sealed condition, because a gap is apt to be left between the furnace body and a movable plasma torch. Reducing gas such as carbon monoxide (CO) will leak through this gap and jeopardize the workers.

Fifth Problem

Some kinds of waste such as incineration residue contain various kinds of low-melting-point matter such as Hg, As, Na, K, Cu, Pb and Zn. When these kinds of waste are melted, the low-melting-point matter is vaporized and dispersed into waste gas. The quantity of the low-melting-point matter contained in the waste depends on the kinds of waste and, in some cases, may amount to 10 to 25% by weight. On many occasions, the low-melting-point matter condenses and accumulates in a cooler and/or a heat exchanger of which a waste-gas purifying plant consists, and a waste-gas outflow duct is choked up thereby. Furthermore, it is always desirable to provide a means for effectively recovering some valuable kinds of the matter such as Cu, Pb and Zn.

Sixth Problem

Although the plasma torch is water-cooled, electrode surfaces come to have a very high temperature and are gradually corroded in course of operation. On many occasions, when the expected life span of the plasma torch has expired, the anode or an end portion of the plasma torch is found to have pinholes. In the worst case, the plasma torch will rupture and a large quantity of cooling water will be ejected into the furnace body. Even an explosion may be caused by the vaporized cooling water.

In order to prevent pinholes from being formed in the end portion of the plasma torch and prevent an accident such as the explosion from occurring, it is most common, every time the plasma furnace has been operated, to subject the end portion of the plasma torch to visual examination for the presence of abnormality such as unsymmetrical wear or the leakage of cooling water.

However, it is difficult to pass a judgment on the corrosion of the end portion of the plasma torch on the basis of visual examination. The leakage of cooling water cannot be infallibly detected during operation. A large quantity of cooling water ejected into the furnace body may cause an explosion if the plasma furnace is kept in operation while nobody becomes aware that the leakage of cooling water has been caused by the deterioration of the plasma torch.

In brief, there is no teaching in the prior art that the aforesaid six problems can be solved somehow or other. This is the very reason why, at the present time, there is no effective commercial plasma furnace available for converting the waste into slag. In view of these circumstances, the primary object of the invention is to provide a plasma furnace and a method of operating the same wherein the slag can be discharged from the furnace at a constant rate. The second object of the invention is to provide a plasma furnace and a method of operating the same wherein the waste is efficiently melted and converted into slag while the preceding slag is discharged from the furnace at a constant rate. The third object of the invention is to provide a plasma furnace and a method of operating the same wherein incineration residue can be filled into a slag catcher in the hearth of the plasma furnace without fail. The fourth object of the invention is to provide a plasma furnace and a method of operating the same wherein only a small quantity of $NO_x$ is produced. The fifth object of the invention is to provide a plasma furnace and a method of operating the same wherein valuable kinds of matter contained in waste gas can be effectively recovered. The sixth object of the invention is to provide a plasma furnace and a method of operating the same wherein an abnormal condition of the plasma torch can be immediately detected during operation and the operator can be warned thereof.

SUMMARY OF THE INVENTION

The first of the foregoing objects is attained by providing a guide chute for guiding waste gas in a direction in which molten slag flows through and out of a slag outlet. This guide chute is made of refractory material so as to allow the high-temperature waste gas to forcedly heat the slag at the downstream end of the slag outlet and its vicinity.

By means of the guide chute, the flow of the high-temperature waste gas is directed downwardly so as to follow the down flow of the molten slag at the downstream end of the slag outlet. Thus the sensible heat of the high-temperature waste gas forcedly and effectively heats the molten slag and the downstream end portion of the slag outlet. Consequently, it becomes less possible for the slag outlet to be choked up.

Assuming that the upstream end of the slag outlet is disposed at a horizontal distance of L from the downstream end of a waste inlet, a pivot, about which a plasma torch is tilted, is disposed at a horizontal distance of 0.2 L to 0.45 L from the downstream end of the waste inlet. This is an arrangement for attaining the second object, i.e. for efficiently melting the waste and converting it into slag while the preceding slag is discharged from the furnace at a constant rate. During operation, the plasma torch is intermittently tilted to the upstream end of the slag outlet or to the downstream end of the waste inlet.

Because of this arrangement, heat from a plasma arc is adapted to be radiated to the downstream end of the waste inlet and its vicinity so as to quickly melt the waste. When there are signs that the slag outlet is being choked up, the plasma torch is slightly tilted to the upstream end of the slag outlet for the purpose of preventing the slag outlet from being choked up. However, by way of precaution against the possibility of melting refractory material, the slag outlet is not directly heated by the radiation from the plasma arc but by the high-temperature waste gas having a temperature approximating 1700° C. This waste gas is allowed to have an optimum flow pattern so as to flow in the longitudinal direction of the slag outlet.

The third object is attained by providing a housing or jacket disposed circumferentially around an incineration residue feed pipe, inserted through the incineration residue inlet, and adapted to allow an annular gas curtain to issue therefrom, and by further providing a driving device for changing the inclination of the jacket, this driving device being associated with a tilting device for changing the inclination of the plasma torch so that, when the inclination of the plasma torch is changed by the tilting device, the inclination of the jacket may also be changed by the driving device. Gas, e.g. air, is delivered from the jacket and directed toward a reservoir of the molten slag in such a manner that the direction of radiation from the plasma torch and the direction of gas delivery from the jacket intersect substantially on the surface of the slag reservoir.

This arrangement is directed to overcoming a problem incidental to a plasma furnace of the kind provided with an induced draft fan which places the incineration residue under the influence of negative pressure in the direction of flow of the incineration residue through the furnace. The incineration residue fed through the incineration residue feed pipe is carried along in the movement of the gas delivered from the Jacket. This arrangement serves to melt the incineration residue and convert it into slag efficiently, because the above-described flow of gas delivered from the jacket never fails to allow the incineration residue to come in contact with the high-temperature area of molten slag in the slag catcher where the radiation from the plasma torch is incident.

The fourth object is attained by providing a means for fuel injection against the waste gas in the furnace body. Preferably, fuel injection is carried out either in a waste gas outlet or in an outlet allotted for discharging both the slag and the waste gas. In the position where fuel injection is carried out, the waste gas is preferably held at a temperature above 500° C. Preferably, the amount of fuel is changed in response to the variation of the amount of plasma gas. Gaseous fuel such as city gas or butane is the most suitable fuel. Highly combustible liquid fuel such as kerosene or fuel oil A is just as good. A small amount of dust fuel may be mixed therewith, if only the mixture is capable of being injected.

The invention contemplates also the provision of a means for injecting combustion air at the downstream side of the above-described means for fuel injection. In the position where combustion air is injected, the waste gas is preferably held at a temperature above 800° C.

Waste gas containing a large quantity of $NO_x$ is discharged either through the waste gas outlet or through the outlet allotted for discharging both the slag and the waste gas. When city gas containing CO is injected into this outlet, reducing gases, i.e. CO and $H_2$, burn in the outlet and $NO_x$ is reduced. Fuel is ignited and converted into reducing gases if the waste gas is held at a temperature above 500° C. in the position where fuel injection is carried out.

At the downstream side of the portion where $NO_x$ is reduced, combustion air is injected toward the waste gas so as to subject the reducing gases such as CO and $H_2$ to complete combustion and inhibit them from being discharged into the open air. The concentration of CO in the waste gas discharged into the open air is held down below 100 ppm if the waste gas is held at a temperature above 800° C. in the area where combustion air is injected.

The fifth object is attained by providing a device for recovering valuable matter from the waste gas. This device includes a water-cooled pipe connected to a flue through which the waste gas discharged from the outlet is flowing away. The water-cooled pipe angles forward at less than 30° to a vertical axis. The device for recovering valuable matter further includes a water-cooled cyclone provided downstream of the water-cooled pipe and designed to collect valuable dust. Preferably, a dilution air pipe is connected either to the upstream portion of the water-cooled pipe or to the downstream portion of the flue. Preferably, a portion of the valuable dust admmitted into the water-cooled cyclone is fed back to the upstream portion of the water-cooled pipe through a dust circulating line.

The fifth object is attained also by providing a method of recovering valuable matter from the waste gas, comprising the steps of cooling the waste gas by allowing it to pass through a pipe which angles forward at less than 30° to a vertical-axis, and separating the valuable dust from the waste gas while the latter continues to be cooled so that, at the end of the separating step, the waste gas may come to have a temperature below 650° C.

An increase in the flow velocity of the waste gas relative to that of the valuable particles and/or in the flow velocity of one valuable particle relative to that of another, hence an increase in the probability of one particle colliding with another, is caused by the pipe which angles forward at less than 30° to a vertical axis. Coagulation resulting from the collision makes the size of resultant particles large enough to be collected by the cyclone. Even if some particles stick to the inner surface of the pipe to the extent of forming a sedimentary layer, the pipe which angles forward at less than 30° to a vertical axis allows the sedimentary layer to be spontaneously stripped from the inner surface of the pipe. The air supplied by the dilution air pipe has an effect of quickly lowering the temperature of the waste gas. A portion of the valuable dust admitted into the water-cooled cyclone and fed back to the upstream portion of the water-cooled pipe has an effect of raising the concentration of valuable matter in the waste gas.

The temperature of the waste gas at the outlet of the water-cooled cyclone held below 650° C. has an effect of coagulating the vaporized and dispersed valuable matter and thereby raising the recovery percentage. The temperature above 650° C. leaves the vaporized and dispersed valuable matter as it is and makes the recovery thereof almost impossible.

The sixth object is attained by providing a device for monitoring the condition of the plasma torch during operation. This device comprises a pressure sensor for detecting a variation in the furnace pressure or in the supply pressure of plasma gas, integrating means for subjecting a signal waveform obtained from the pressure sensor to spectral integral in specific frequency bands, first means for comparing values obtained from the spectral integral with a first prescribed reference value and generating a signal when the former values are greater than the latter value, a voltage sensor for detecting a variation in supply voltage for the plasma torch, second means for comparing a signal obtained from the voltage sensor with a second prescribed reference value and generating a signal when a drop in the supply voltage is detected, and discriminating means for generating a signal for suspending the operation of the plasma torch when the signals generated by the first and second means are received. The first prescribed reference value, with which the values obtained from the integrating means are compared in the first means, varies with a variation in the flow of plasma gas out of the plasma torch.

Because of the provision of the above-described device for monitoring the condition of the plasma torch during operation, an abnormal condition of the plasma torch can be immediately detected during operation and the operator can be warned thereof. To be concrete, the pressure sensor detects a variation in the furnace pressure caused by the leakage of cooling water out of the plasma torch or a variation in the supply pressure of plasma gas, and the voltage sensor detects a variation in supply voltage for the plasma torch. The integrating means subjects a signal waveform obtained from the pressure sensor to spectral integral in a prescribed frequency band. The first means compares a value obtained from the integrating means with a prescribed reference value and generates a signal when the former value is greater than the latter value. The second means compares a signal obtained from the voltage sensor with a prescribed reference value and generates a signal when a drop in the supply voltage is detected. The discriminating means generates a signal for suspending the operation of the plasma torch when the signals generated by the first and second means are received.

BRIEF DESCRIPTION OF THE DRAWINGS

FIG. 21 illustrates an example of the combinations of output states to be exhibited by two comparator means.

DESCRIPTION OF THE PREFERRED EMBODIMENTS

The following description is given as a nonlimiting example and with reference to the drawings.

Figure 1:
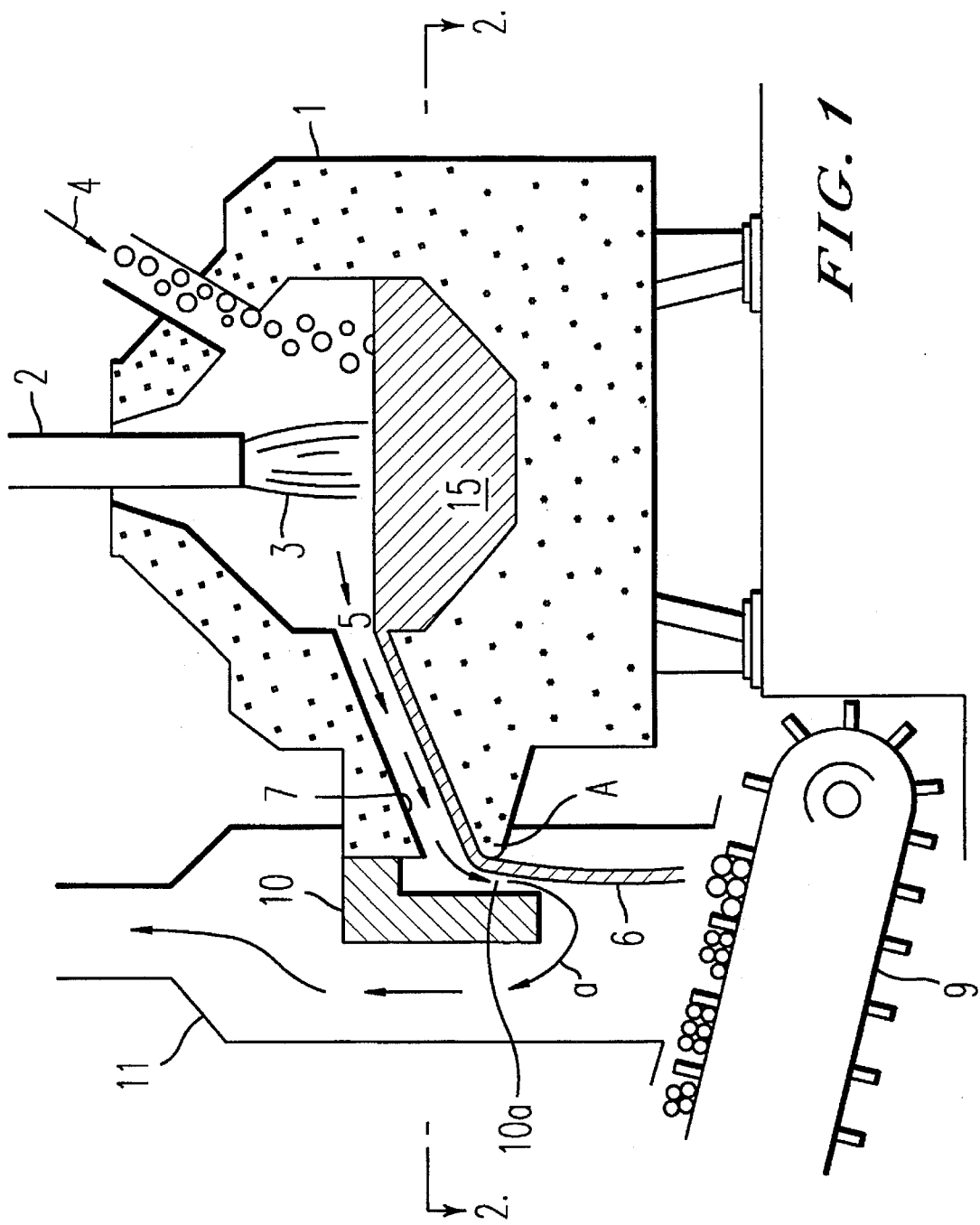
FIG. 1 illustrates a vertical section through a plasma furnace of the present invention.
Figure 2:
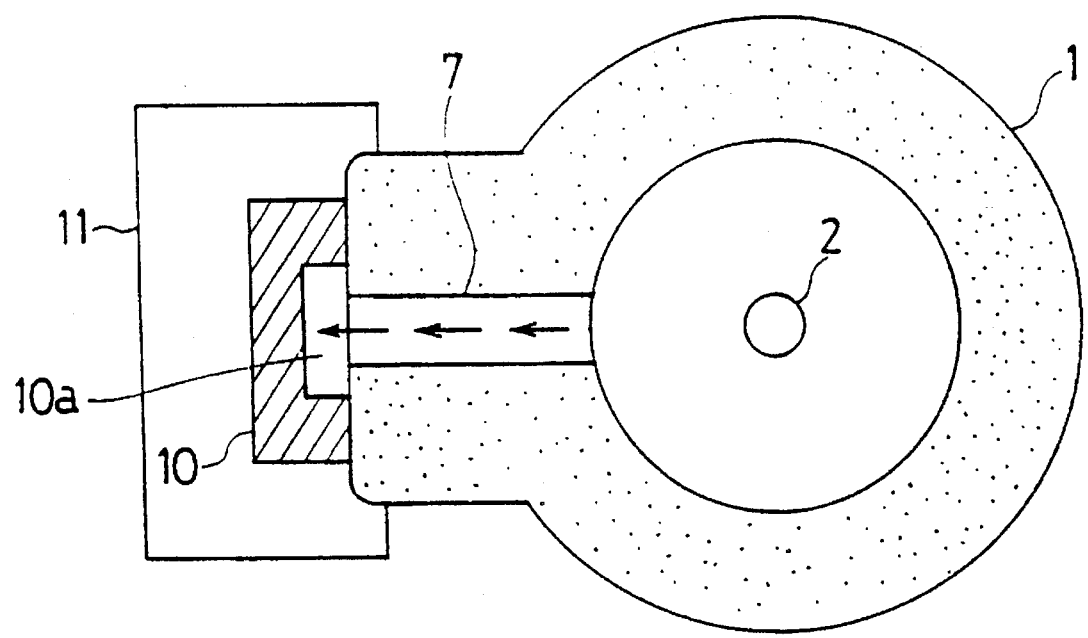
FIG. 2 illustrates a horizontal section as seen along the line X—X of FIG. 1.

Referring now to FIGS. 1 and 2, a plasma furnace 100 in accordance with the present invention is designed to allow molten slag to be discharged therefrom at a constant rate. FIG. 1 illustrates a vertical section through the plasma furnace 100, and FIG. 2 illustrates a horizontal section as seen along the line X—X of FIG. 1.

Reference will first be specifically made to the construction of the plasma furnace 100, and then be made to a method of operating the same.

The plasma furnace shown in FIG. 1 includes a furnace body 1 having an outer surface water-cooled and an inside refractory-lined so that heat dissipation through the furnace wall may be minimized and the expected life span of the plasma furnace may be lengthened. A slag reservoir 15 is formed in the interior of the furnace body 1. The furnace body 1 is provided with a waste inlet 12 through which waste 4 is fed to the slag reservoir 15 and a slag outlet 7 through which a portion of the molten slag 6 is allowed to leave the slag reservoir 15. A plasma torch 2 is inserted down through an opening arranged at the top of the furnace body 1. The plasma torch 2 is directed against the slag reservoir 15 and strikes a high-temperature plasma arc 3. The waste 4 is delivered to the waste inlet 12 by a conventional delivery apparatus (not shown) such as a screw feeder or a belt conveyor, introduced into the furnace body 1 through the waste inlet 12, and heated by the plasma arc 3 so as to be melted and form a slag reservoir 15. When the waste 4 is continuously introduced into the furnace body 1, a portion of the molten slag 6 runs over the upstream end of the slag outlet 7 and leaves the furnace body 1. High-temperature waste gas 5 is also discharged through the slag outlet 7 into a flue 11. The molten slag 6 which has left the furnace body 1 is water- or air-cooled, collected on a carrying apparatus 9 such as a conveyor, and carried forward to a place where the cooled slag 6 is kept in storage containers (not shown).

An important feature of the present invention is that a guide chute 10 made of refractory material is provided at the downstream end of the slag outlet 7. The guide chute 10 is of inverted L-shaped section as viewed along a vertical plane on which the longitudinal axis of the slag outlet 7 lies, and of U-shaped section as viewed along a horizontal plane (as best seen in FIG. 2). Consequently, together with a portion of the furnace body 1, the guide chute 10 defines a barrel-shaped space which is closed at the top and open at the bottom 10a so as to direct the flow of the waste gas 5 downwardly, i.e., in the direction of down flow of the molten slag 6. The waste gas 5 is discharged through the slag outlet 7 together with the molten slag 6 and directed downwardly at the downstream end A of the slag outlet 7 so as to further follow the down flow of the molten slag 6 and pass through the open bottom 10a of the guide chute 10. Then the direction of flow of the waste gas 5 is varied as indicated by an arrow a, and the waste gas 5 is carried up through the flue 11.

Reference will now be specifically made to a method of operating the above-described plasma furnace of the present invention. The waste gas 5 is carried from within the furnace body 1 to the downstream end A of the slag outlet 7 and directed downwardly by the guide chute 10 so as to further follow the flow of the molten slag 6. Then the direction of flow of the waste gas 5 is varied, and the waste gas 5 is carried up through the flue 11. In the guide chute 10, the high-temperature waste gas 5 flowing downwardly has an effect of heating the downstream end A of the slag outlet 7 and the slag 6 per se.

It is not without reason that the present inventors attach great importance to the heating of the downstream end A of the slag outlet 7. In prior art, in which there has not heretofore been provided a member similar to the guide chute 10, the waste gas 5 is separated from the molten slag 6 at the downstream end A of the slag outlet 7 and carried up without being directed downwardly. Consequently, the temperature of the downstream end A of the slag outlet 7 falls to such an extent that the molten slag 6 is solidified in this portion of the slag outlet 7, which is choked up by the gradual accumulation of the solidified slag 6. A great deal of effort has been expended by the present inventors in inquiring into the cause of this solidification in prior art, and it has been found that waste gas discharged from a plasma furnace has only a small quantity of sensible heat because the amount of waste gas discharged therefrom is less than one-thirtieth of the amount of waste gas discharged from a combustion furnace and that the temperature of refractory material at the downstream end A of the slag outlet 7 falls because of heat dissipation therefrom and infiltration of cold air into the flue 11 through a small gasketed slot formed between the carrying apparatus 9 and the lower end of the flue 11.

The present invention solves the aforesaid problem by providing the guide chute 10 made of refractory material in such a manner that the vicinity of the downstream end A of the slag outlet 7 is covered with the guide chute 10 so that heat dissipation may be minimized and the space defined by the guide chute 10 may be held at a high temperature. The open bottom 10a of the guide chute 10 is disposed below the downstream end A of the slag outlet 7 so as to forcedly carry the waste gas 5 to the downstream end A of the slag outlet 7 where the temperature is apt to fall. Although the downstream end A of the slag outlet 7 of a prior art plasma furnace has a temperature approximating 1150° C. at the most, the waste gas 5 forcedly directed downwardly by the guide chute 10 has an effect of allowing the temperature of the downstream end A of the slag outlet 7 to rise to 1320° C. The molten slag 6 is not solidified any longer, but is discharged at a constant rate.

Figure 3:
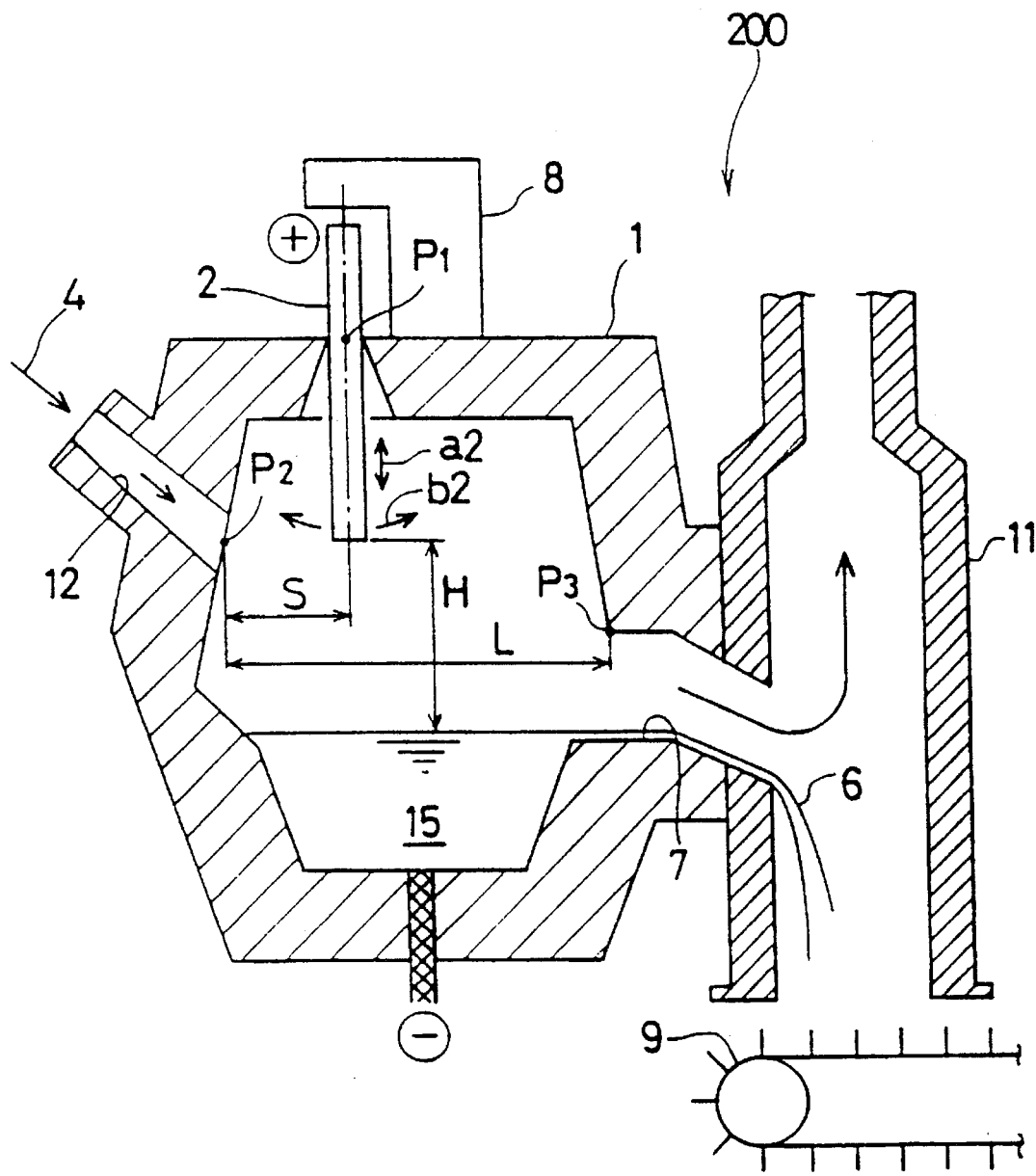
FIG. 3 is a schematic illustration to help explain the structural construction of another embodiment of the present invention.

Referring now to FIGS. 3 to 7, a plasma furnace 200 in accordance with the present invention is designed to efficiently melt the waste and convert it into slag while the preceding slag is discharged from the furnace at a constant rate. In FIG. 3, like numerals are employed to designate like parts appearing in FIG. 1.

The plasma furnace 200 is of transfer type, having electrodes disposed in the plasma torch 2 and in the bottom section of the furnace body 1 respectively. FIG. 3 illustrates an example of the reversed polarity type in which an anode is disposed in the plasma torch 2 and a cathode is disposed in the bottom section of the furnace body 1. However, it is to be understood that the arrangement shown in FIG. 3 was merely given as a preferred embodiment of the invention and is not to be deemed limitative of the same and that this arrangement may be readily replaced by other arrangements such as those of nontransfer type and/or of straight polarity type.

The upper surface of the furnace body 1 carries a driving device 8 for moving the plasma torch 2. The plasma torch 2 can be moved thereby in its axial directions a2 and swung about its pivot P1 with directions b2 of swinging motion along a vertical plane on which an exit point P2 of the waste inlet 12 and an entry point P3 of the slag outlet 7 lie. Assuming that the entry point P3 is disposed at a horizontal distance of L from the exit point P2 and that the pivot P1 is disposed at a horizontal distance of S from the exit point P2, the pivot P1 is positioned in such a manner that a quotient obtained from dividing S by L falls within a range between 0.2 and 0.45 so that the plasma torch 2 may be nearer to the waste inlet 12 than to the slag outlet 7. This constitutes another feature of the present invention and serves to allow the plasma torch 2 to directly radiate the plasma arc 3 on the waste 4 which has just been fed through the waste inlet 12. Thus the condition under which the waste 4 is melted as soon as it is introduced into the furnace body 1 is maintained.

In operation, the value of the current supplied to the plasma torch 2 is kept constant. Voltage control for the purpose of power control is effected by controlling the distance H from the lower end of the plasma torch 2 to the surface of the slag reservoir 15. The plasma torch 2 is intermittently tilted toward the upstream end of the slag outlet 7 or toward the downstream end of the waste inlet 12.

Figure 4:
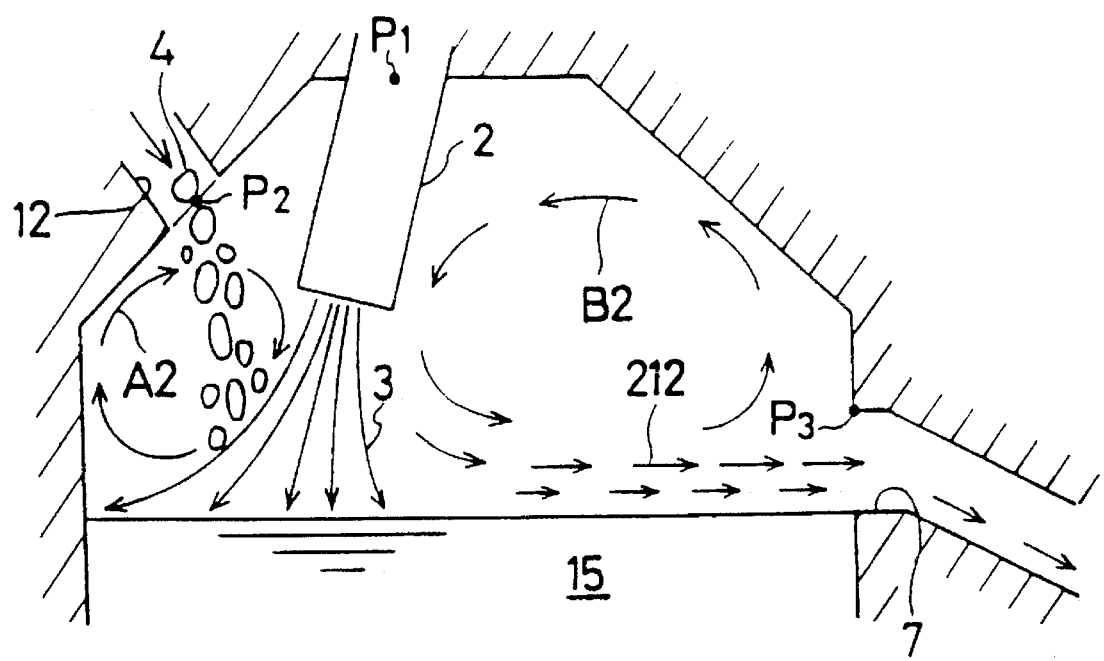
FIG. 4 is a schematic illustration to help explain how the waste is positively melted in the plasma furnace shown in FIG. 3.

FIG. 4 illustrates how the waste 4 is positively melted in the plasma furnace 200. The plasma torch 2 is intermittently moved to a position shown in FIG. 5 when there is a sign that the molten slag 6 is solidified in the slag outlet 7.

The plasma arc 3 shown in FIG. 4 directly heats a portion of the surface of the slag reservoir 15 to which the waste 4 is dropping. The waste 4, which has been held at room temperature, is immediately heated by the ultrahigh-temperature plasma arc 3 and melted into the slag reservoir 15. In prior art, the waste 4 is dropped into the slag reservoir 15, in which the waste 4 is not melted until the heat of the molten slag 6 is taken up by the waste 4. On many occasions, some of the waste 4 such as the fragments of broken china floats on the slag reservoir 15 and is discharged through the slag outlet 17 in an unmelted state. The present invention eliminates this type of the disadvantages of earlier plasma furnaces as discussed above, and is characterized by a very high efficiency of heat transfer. This is because the heat given off by the ultrahigh-temperature plasma arc 3 is directly taken up by the low-temperature waste 4.

Reference will now be specifically made to a flow pattern after which the waste gas 5 flows in the plasma furnace 200. In the vicinity of the downstream end of the waste inlet 12, a strong whirlwind A2 is caused by the plasma torch 2 slightly tilted to the downstream end of the waste inlet 12. This whirlwind A2 serves for the improvement of efficiency in converting the waste 4 into slag 6. Plasma gas 212 is ejected from the lower end of the plasma torch 2 at the rate of 300 to 500 meters a second. This speed is high enough to engulf the waste 4 and immediately heat and melt it. The waste 4 in the form of coarse particles is allowed to collide with the surface of the slag reservoir 15. Fine particles are instantaneously melted, converted into slag 6, and allowed to collide with the surface of the slag reservoir 15. Ultrafine particles go with the whirlwind A2 and are converted into slag 6 as a result of coalescence or sticking to the inner surface of the furnace body 1. Some of the ultrafine particles are carried over to the downstream side of the interior of the furnace body 1 and engulfed by a whirlwind B2, which converts most of them into slag 6. The plasma gas 212 ejected at high speed toward the slag outlet 7 has an effect of agitating the slag reservoir 15 and keeping the slag 6 in a molten state.

Figure 5:
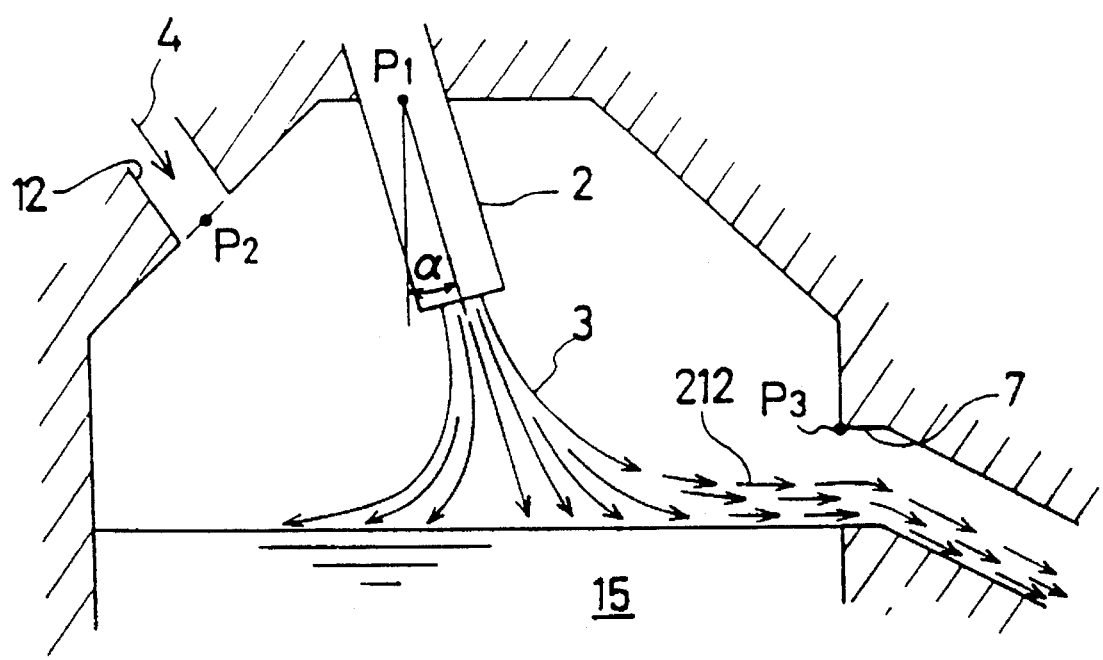
FIG. 5 is a schematic illustration to help explain a temporary state to which a plasma torch is intermittently moved in the plasma furnace shown in FIG. 3.

When there is a sign that the molten slag 6 is solidified in the slag outlet 7, the plasma torch 2 is swung by an angle α about its pivot P1 as shown in FIG. 5. Then the high-temperature plasma gas 212 is positively directed toward the slag outlet 7 for several minutes so that the slag outlet 7 my be cleared of choking-up by the plasma gas 212 having a high temperature above 1700° C. Signs of choking-up in the slag outlet 7 can be detected by a pressure buildup in the furnace body 1 or by an increase in the difference between the internal pressure of the furnace body 1 and that of the flue 11. When α assumes a value of about 5°, the plasma arc 3 having a temperature approximating 10,000° C. first collides with the surface of the slag reservoir 15 and then is directed toward the slag outlet 7, heating the slag 6. The surface temperature of the slag reservoir 15 in the vicinity of the slag outlet 7 becomes high. The molten slag 6 is stuffed into the slag outlet 7 by the high-temperature plasma gas 212, by which the slag outlet 7 is kept free of choking-up. In the embodiment shown in FIGS. 4 and 5, the value of α falling within the range between plus and minus 15° is quite enough to prevent a double-arc phenomenon from occurring.

Figure 6:
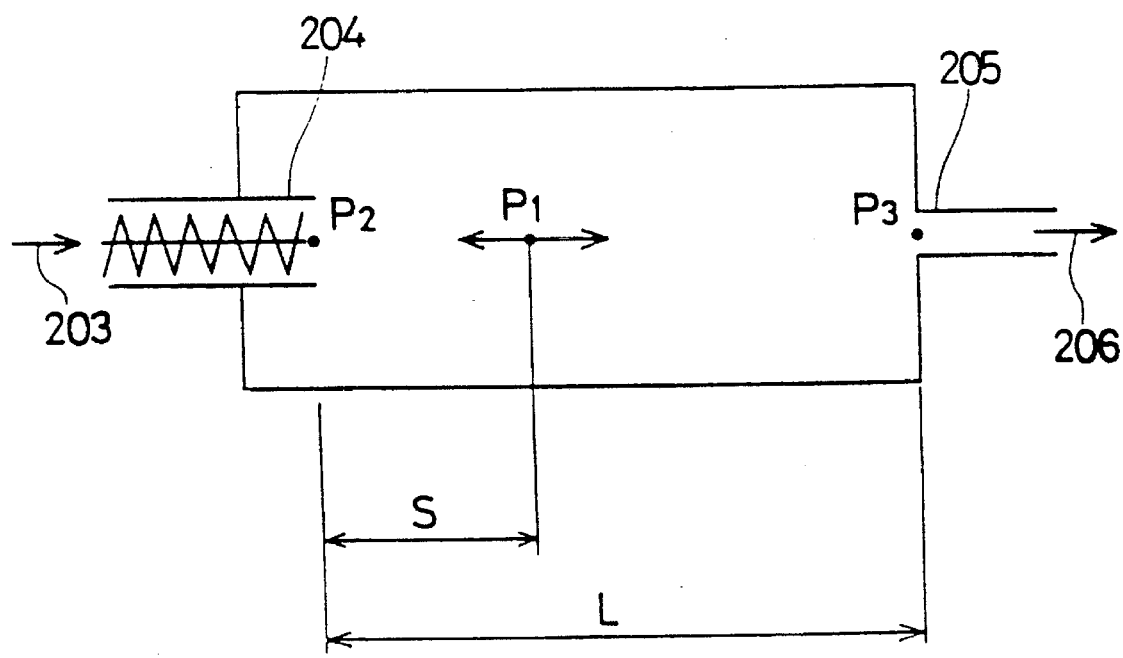
FIG. 6 is a schematic illustration to help explain the structural construction of still another embodiment of the present invention.

Still another embodiment of the present invention shown in FIG. 6 is an example of a rectangular plasma furnace having a plasma torch output power of 1.5 MW or more. The rectangular plasma furnace is preferable to a cylindrical plasma furnace which requires a plasma torch 2 capable of precession. The reason for the necessity of providing a cylindrical plasma furnace with a plasma torch 2 capable of precession is that the diameter of the radiation field of the plasma arc 3 is not necessarily proportional to the sizes of the plasma torch 2 and the plasma furnace. In case of a rectangular plasma furnace, a plasma torch 2 capable of swing motion instead of precession is quite enough to continuously melt the waste 4 to a satisfactory degree. In the same manner as mentioned above, the pivot P1 is positioned in such a manner that a quotient obtained from dividing S by L falls within a range between 0.2 and 0.45.

Figure 7:
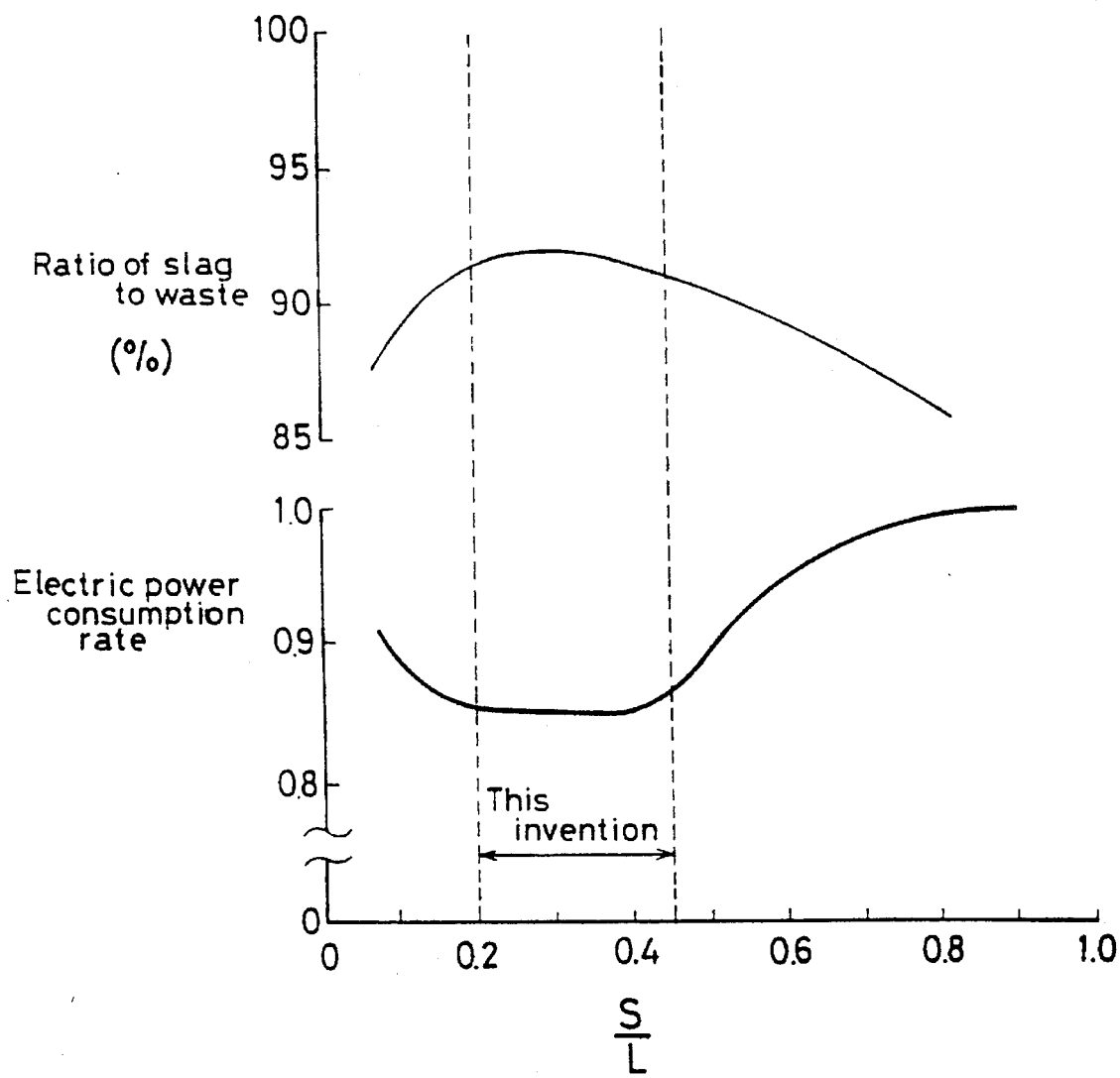
FIG. 7 is a graphical representation, illustrating how the position of a pivot about which the plasma torch is swung has an influence on an electric power consumption rate and on the ratio of the amount of slag to the amount of waste fed to the plasma furnace.

The following specific example will serve to illustrate the above-described embodiment. The incineration residue of municipal refuse was fed to the plasma furnace 200 shown in FIG. 3 at the rate of 300 kg an hour. The output power used for melting the incineration residue by means of the plasma torch 2 of transfer type was 300 kW. The swing motion of the plasma torch 2 was controlled so that the angle of swing might fall within the range between plus and minus 5°. Data were obtained when the plasma arc 3 and the discharge of the molten slag 6 were stabilized and when an electric power consumption rate was low. FIG. 7 illustrates how the position of the pivot P1 has an influence on the electric power consumption rate and on the ratio, in terms of percentage by weight, of the amount of slag 6 to the amount of incineration residue fed to the plasma furnace 200. When the plasma torch 2 is brought close to the slag outlet 7, the strong whirlwind B2 shown in FIG. 4 is moved away from the waste inlet 12. The retention time of the plasma gas 212 in the furnace body 1 becomes so short that the high-temperature plasma gas 212 has not enough time to convert the whole of the incineration residue into slag 6. Thus a decrease in the ratio of the amount of slag 6 to the amount of incineration residue fed to the plasma furnace 200, to which an aggravated electric power consumption rate can be attributed, is caused by the shortened retention time of the plasma gas 212 in the furnace body 1. When the plasma torch 2 is brought close to the waste inlet 12, the whirlwind A2 shown in FIG. 4 becomes too small and a portion of the furnace wall is subjected to local heating. An increase in heat loss is caused thereby, and this also leads somewhat to a decrease in the ratio of the amount of slag 6 to the amount of incineration residue fed to the plasma furnace 200 and an aggravated electric power consumption rate. FIG. 7 indicates that, when the pivot P1 is positioned in such a manner as mentioned at the end of the preceding paragraph, the ratio of the amount of slag 6 to the amount of incineration residue fed to the plasma furnace 200 is about 92% or more and the electric power consumption rate is 0.87 or less. This means that, when the pivot P1 is positioned in the above-described manner, the state of the interior of the furnace body 1 as shown in FIG. 4 can be realized and the discharge of the molten slag 6 can be stabilized without subjecting the plasma torch 2 to a swing motion at a large angle of swing.

Figure 8:
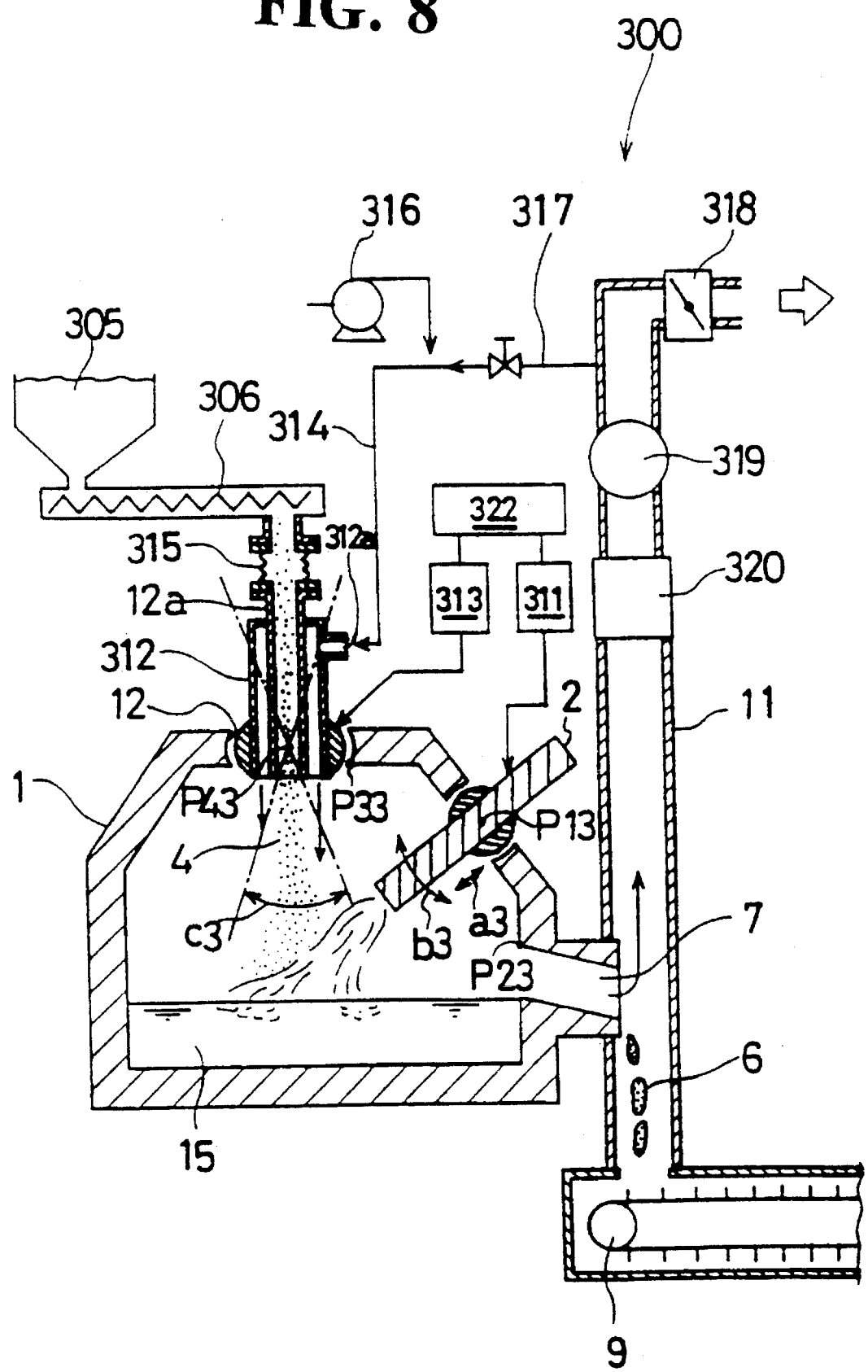
FIG. 8 is a schematic illustration to help explain the structural construction of yet still another embodiment of the present invention.

Referring now to FIG. 8, a plasma furnace 300 in accordance with the present invention is designed especially to allow dispersive waste such as incineration residue to be filled into a slag catcher without fail.

The plasma furnace BOO shown in FIG. 8 includes a cylindrical furnace body 1 having an outer surface water-cooled and an inside refractory-lined. The cylindrical furnace body 1 furthermore has an oblique portion at the upper edge. The plasma torch 2 is inserted through an opening arranged at this portion. A housing or jacket 312, which is disposed circumferentially around an incineration residue feed pipe 12a, is inserted down through the incineration residue inlet 12 arranged at the top of the furnace body 1. The incineration residue 4 is fed to the furnace body 1 through a hopper 305, screw feeder 306, feed pipe 12a and inlet 12. The molten slag 6 runs over the upstream end of the slag outlet 7 formed in the cylindrical sidewall of the furnace body 1, leaves the furnace body 1, cools down, and becomes lithic so as to be collected on the conveyor 9.

A driving device 311 for tilting the plasma torch 2 is disposed over the furnace body 1. The plasma torch 2 can be moved thereby in its axial directions a3 and swung about its pivot P13 with directions b3 of swinging motion along a vertical plane on which an entry point P23 of the slag outlet 7 and an exit point P33 of the inlet 12 lie. The aim of this arrangement is to prevent the operation of the plasma furnace from being compelled to be suspended for the reason that the slag 6, which has been continuously discharged from the plasma furnace, is cooled and solidified at the slag outlet 7 and thereby chokes up the slag outlet 7. The plasma torch 2 is swung about its pivot P13 so that the radiation field of the plasma arc 3 may range from the surface of the slag reservoir 15 to the upstream end of the slag outlet 7. Consequently, the molten slag 6 in the slag outlet 7 is directly heated by the plasma arc 3 and thereby prevented from being cooled. Thus the molten slag 6 is allowed to continuously leave the plasma furnace. In view of this aim, the plasma torch 2 is preferably disposed over the slag outlet 7.

A feature of the present invention is that the feed pipe 12a, which is inserted down through the inlet 12, extends coaxially of and through the tubular jacket 312, that the feed pipe 12a and the jacket 312 form an annulus therebetween to which air or other gas is supplied from a gas-supply pipe 314 through a gas inlet 312a, and that the lower end of the annulus terminates in an opening through which the air or other gas under pressure passes and is directed toward an area of the surface of the slag reservoir 15 on which the plasma arc 3 is incident. An annular gas curtain thus formed has an effect of directing the incineration residue 4 toward an area of the surface of the slag reservoir 15 on which the plasma arc 3 is incident. A driving device B13 for varying the direction of the gas curtain is disposed over the furnace body 1. The jacket 312 can be swung thereby about its pivot P43 as indicated by an arrow c3. The driving device 313 is associated with the driving device 311 so that a change in the inclination of the plasma torch 2 may always be accompanied by a change in the inclination of the jacket 312 such that the direction of radiation from the plasma torch 2 and the direction of the gas curtain always intersect on the surface of the slag reservoir 15.

The feed pipe 12a is connected at the upper end to the screw feeder 306 by means of a flexible bellows 315, because the above-described change in the inclination of the jacket 312 is always accompanied by a change in the inclination of the feed pipe 12a. It should be mentioned that the force of the fluid issuing from the jacket 312 should be stronger than the influence of negative pressure caused by an induced draft fan which will appear hereinafter and that the quantity of the fluid issuing from the jacket 312 should not be so large as to cause a temperature drop of the furnace body 1 to the extent of exerting an adverse influence on the melting rate of the incineration residue 4. In order to prevent the furnace body 1 from sustaining a temperature drop, it is preferable to allow recycle gas to issue from the jacket 312 as will appear hereinafter.

The plasma furnace 300 further includes a control device 322 for effecting gang control over the driving devices 311 and 313 such that, when the plasma torch 2 is tilted toward the slag outlet 7 (i.e. toward the point P23), the gas curtain issuing from the jacket 312 is moved to the right as viewed on FIG. 8 and, when the plasma torch 2 is tilted toward the inlet 12 (i.e. toward the point PBB), the gas curtain issuing from the jacket 312 is moved to the left as viewed on FIG. 8. Thus the gang control effected by the control device 322 has an effect of always allowing the direction of radiation from the plasma torch 2 and the direction of the gas curtain issuing from the jacket 312 to intersect on the surface of the slag reservoir 15.

In order to prevent pulverulent incineration residue 4 from being dispersed into ambient air at the time when such incineration residue is being fed to the furnace body 1 or is about to be melted therein, the incineration residue 4 in the furnace body 1 is placed under the influence of negative pressure caused by an induced draft fan 319 in the direction of flow of the air or other gas from the inlet 12 to the outlet 7. During the discharge of the molten slag 6 through the slag outlet 7, the induced draft fan 319 acting through the flue 11 causes a flow of the gas through the slag outlet 7. Then the direction of flow of the gas is varied as indicated by an arrow, and the gas is carried up through the flue 11. A bag filter 320 provided in the flue 11 allows for the removal of fine particles from the gas. Then the gas continues to be forced upward and passes out of the flue 11 through the induced draft fan 319 and a damper 318.

A gas circulating line 317 is used when the waste gas is to be supplied from the flue 11 to the gas-supply pipe 314 as recycle gas as will appear hereinafter. Both the flow of the waste gas out of the flue 11 into the open air and the supply of the waste gas from the flue 11 to the gas-supply pipe 314 through the gas circulating line 317 can be influenced by means of the damper 318.

In addition to the above-described waste gas supplied through the gas circulating line 317, fresh gas supplied by a gas blower 316 is also available as air or other gas to be supplied to the gas-supply pipe 314. Preferably, either of these two kinds of gas may be used according to circumstances. The advantage offered by using the waste gas as recycle gas consists in the point that, since the waste gas is hot from the furnace body 1, the waste gas is still held at a high temperature as compared with the fresh gas supplied by the gas blower 316. When such waste gas is recycled and allowed to issue again from the jacket 312, only a slight temperature drop of the furnace body 1, which falls short of exerting an adverse influence on the melting rate of the incineration residue 4, is caused thereby. The supply of fresh gas by the gas blower 316 should be restricted to the case where the quantity of the fluid which is to issue from the jacket 312 has decreased.

In operation, the incineration residue 4 is fed to the furnace body 1 through the hopper 305, screw feeder 306, feed pipe 12a and inlet 12. Right up to the moment when the incineration residue 4 is blown against the surface of the slag reservoir 15, the incineration residue 4 discharged from the inlet 12 into the furnace body 1 goes side by side with the gas issuing from the jacket 312. Thus the incineration residue 4 discharged from the inlet 12 into the furnace body 1 is prevented from passing out of the furnace body 1 through the slag outlet 7 without coming into contact with the area of the surface of the slag reservoir 15 toward which the plasma torch 2 is directed.

The driving device 313 is associated with the driving device 311 such that the jacket 312 is moved as indicated by an arrow c3 according to the direction in which the plasma torch 2 is tilted as indicated by an arrow b3 so that the incineration residue 4 may always be directed toward the area of the surface of the slag reservoir 15 toward which the plasma torch 2 is directed. Thus the incineration residue 4 is allowed to fall onto this high-temperature area, efficiently melted, and converted into slag 6.

The molten slag 6 runs over the upstream end of the slag outlet 7 formed in the cylindrical sidewall of the furnace body 1, leaves the furnace body 1, cools down, and becomes lithic so as to be collected on the conveyor 9. The waste gas is carried up through the flue 11 under the influence of negative pressure caused by the induced draft fan 319. Then the waste gas passes out of the flue 11 through the bag filter 320 and the induced draft fan 319. A portion of the waste gas is supplied as recycle gas to the gas-supply pipe 314 through the gas circulating line 317, admitted into the jacket 312 through the gas inlet 312a, and directed again toward the area of the surface of the slag reservoir 15 toward which the plasma torch 2 is directed.

A swirl vane may be provided within the jacket 312 in the vicinity of the lower end thereof. This swirl vane will impart a tangential component of velocity to the annular gas curtain issuing from the jacket 312. The tangential component of velocity imparted to the annular gas curtain will serve to engulf the gas flow which may be present around the gas curtain and will thereby prevent the incineration residue 4 from being dispersed. Furthermore, angular moment imparted to the incineration residue 4 by this tangential component of velocity will facilitate the infiltration of the incineration residue 4 into the slag reservoir 15.

It should be re-emphasized that a feature of the plasma furnace 300 is that the jacket 312 is inserted down through the incineration residue inlet 12 arranged at the top of the furnace body 1, that air or other gas is allowed to issue from the jacket 312 and directed toward the surface of the slag reservoir 15, that the driving device 313 for varying the direction of the gas curtain issuing from the jacket 312 is disposed over the furnace body 1, and that the driving device 311 for tilting the plasma torch 2 is associated with the driving device 313 so that a change in the inclination of the plasma torch 2 may always be accompanied by a change in the inclination of the jacket 312. The direction of the gas curtain and the direction of radiation from the plasma torch 2 are always allowed to intersect on the surface of the slag reservoir 15. The incineration residue 4 fed through the feed pipe 12a is carried along in the movement of the air or other gas delivered from the jacket 312 and directed toward the area of the surface of the slag reservoir 15 toward which the plasma torch 2 is directed. The air or other gas delivered and directed in this manner has an effect of preventing the incineration residue 4 from passing out of the furnace body 1 through the slag outlet 7 without coming into contact with the surface of the slag reservoir 15. It is by no means unwarranted to advocate this effect even in the presence of the induced draft fan 319 which is apt to place the incineration residue 4 under the influence of negative pressure in the direction of flow of the air or other gas from the inlet 12 to the outlet 7. Thus the incineration residue 4 can be infiltrated into the slag reservoir 15 without fail. Furthermore, the incineration residue 4 is always directed toward the high-temperature area of the surface of the slag reservoir 15 toward which the plasma torch 2 is directed. Thus the incineration residue 4 is allowed to fall onto this high-temperature areas, efficiently melted, and converted into slag 6.

The waste gas which has just been discharged from the furnace body 1 is still held at a comparatively high temperature. When such waste gas is recycled and allowed to issue again from the jacket 312, only a slight temperature drop of the furnace body 1, which falls short of exerting an adverse influence on the melting rate of the incineration residue 4, is caused thereby.

Figure 9:
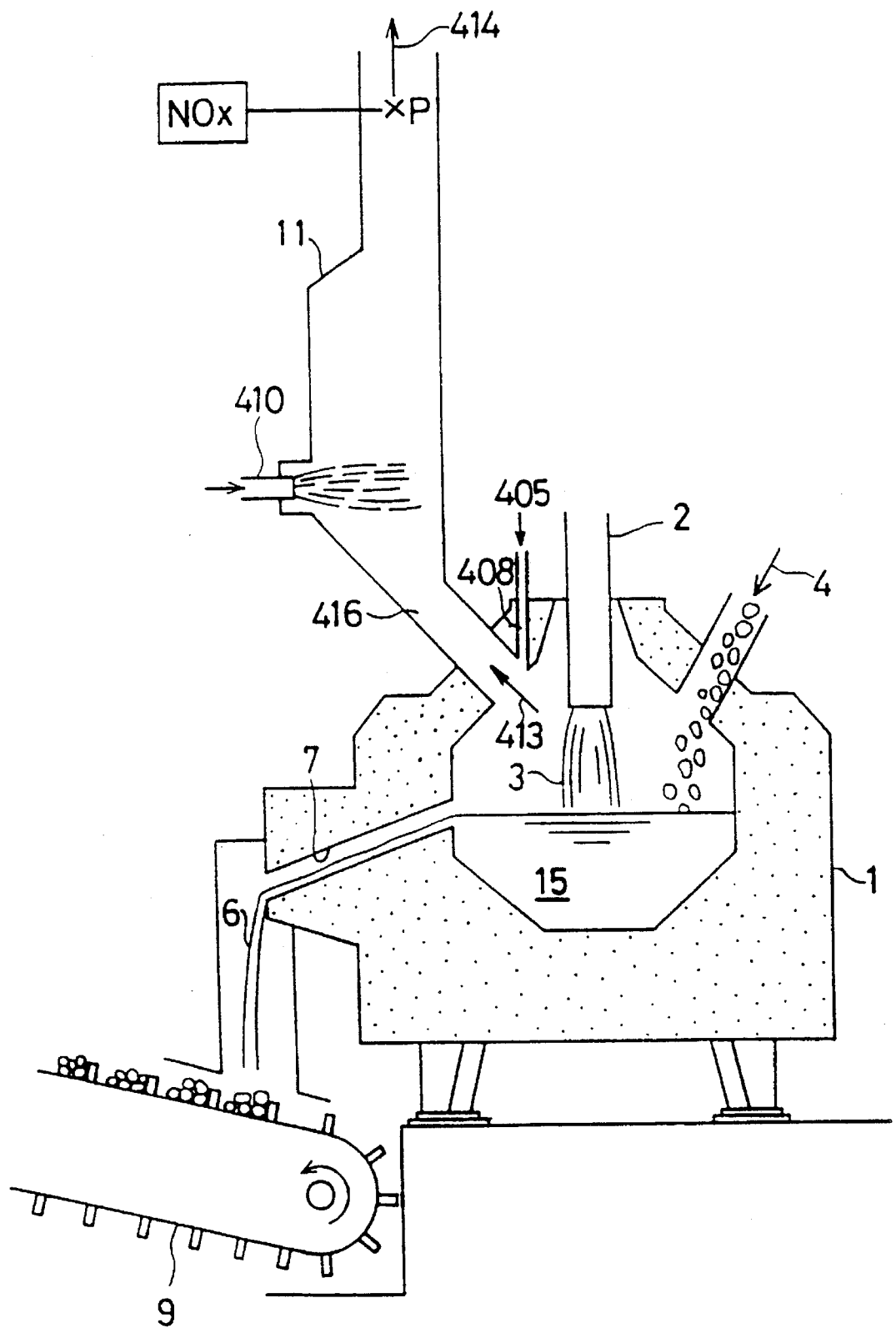
FIG. 9 is a schematic illustration to help explain a method of operating the plasma furnace with a view to decreasing the amount of $NO_x$.
Figure 10A:
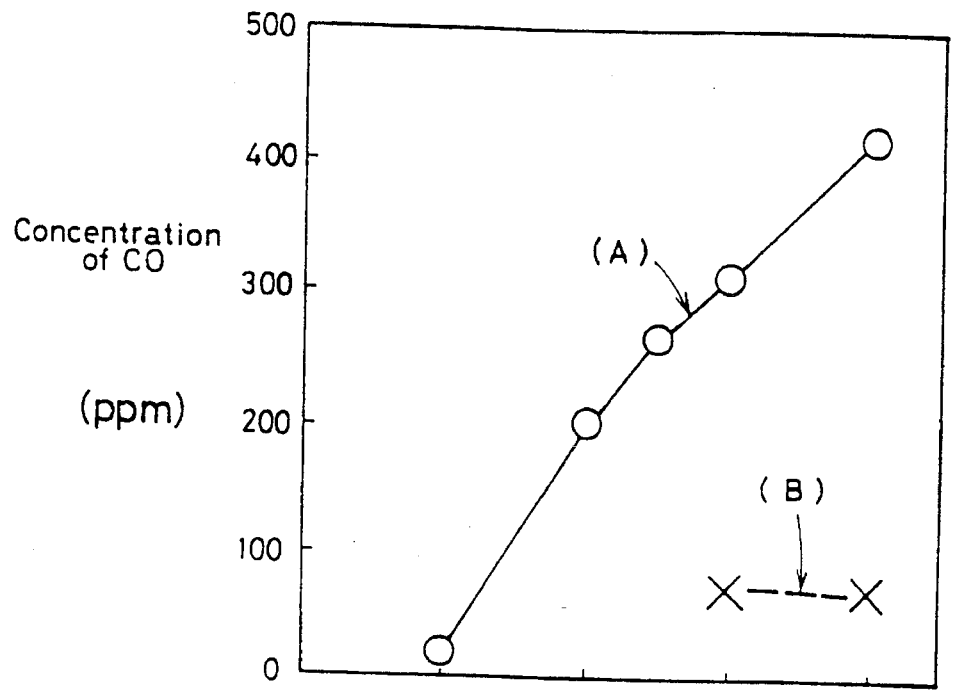
FIG. 10(a) illustrates the relationship between the amount of fuel injected toward the waste gas and the concentration of CO resulting therefrom.
Figure 10B:
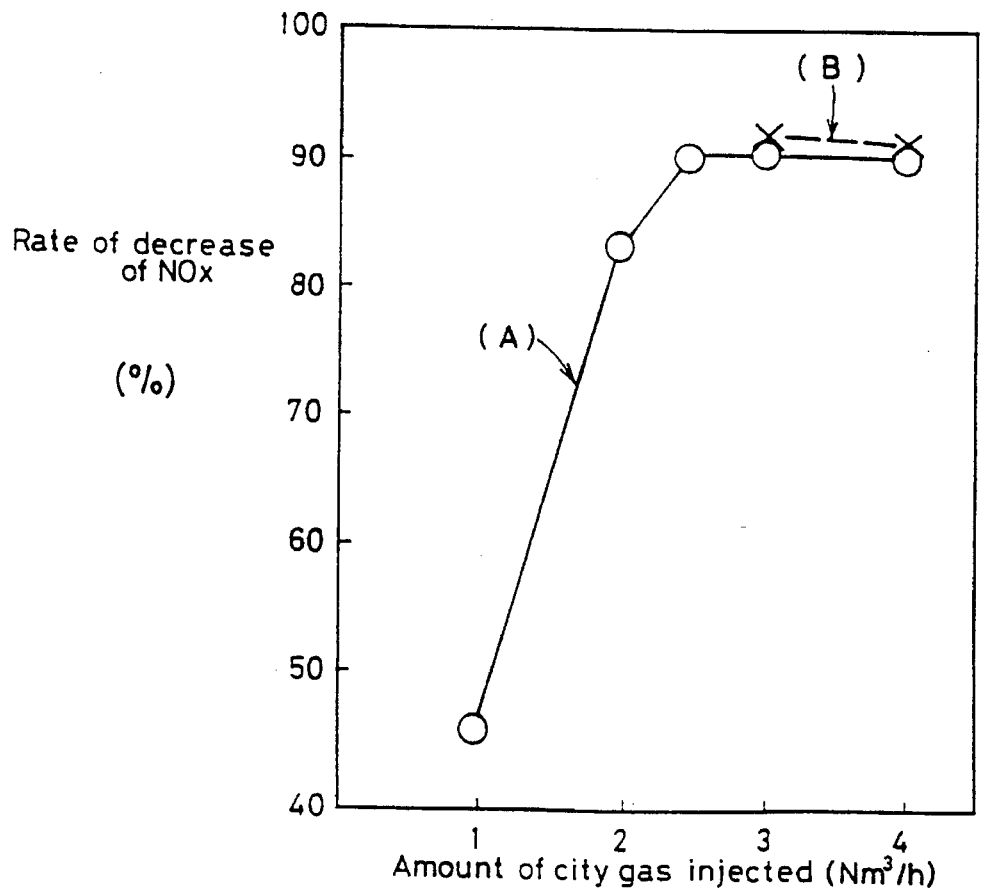
FIG. 10(b) illustrates the relationship between the amount of fuel injected toward the waste gas and the rate of decrease of $NO_x$.
Figure 11:
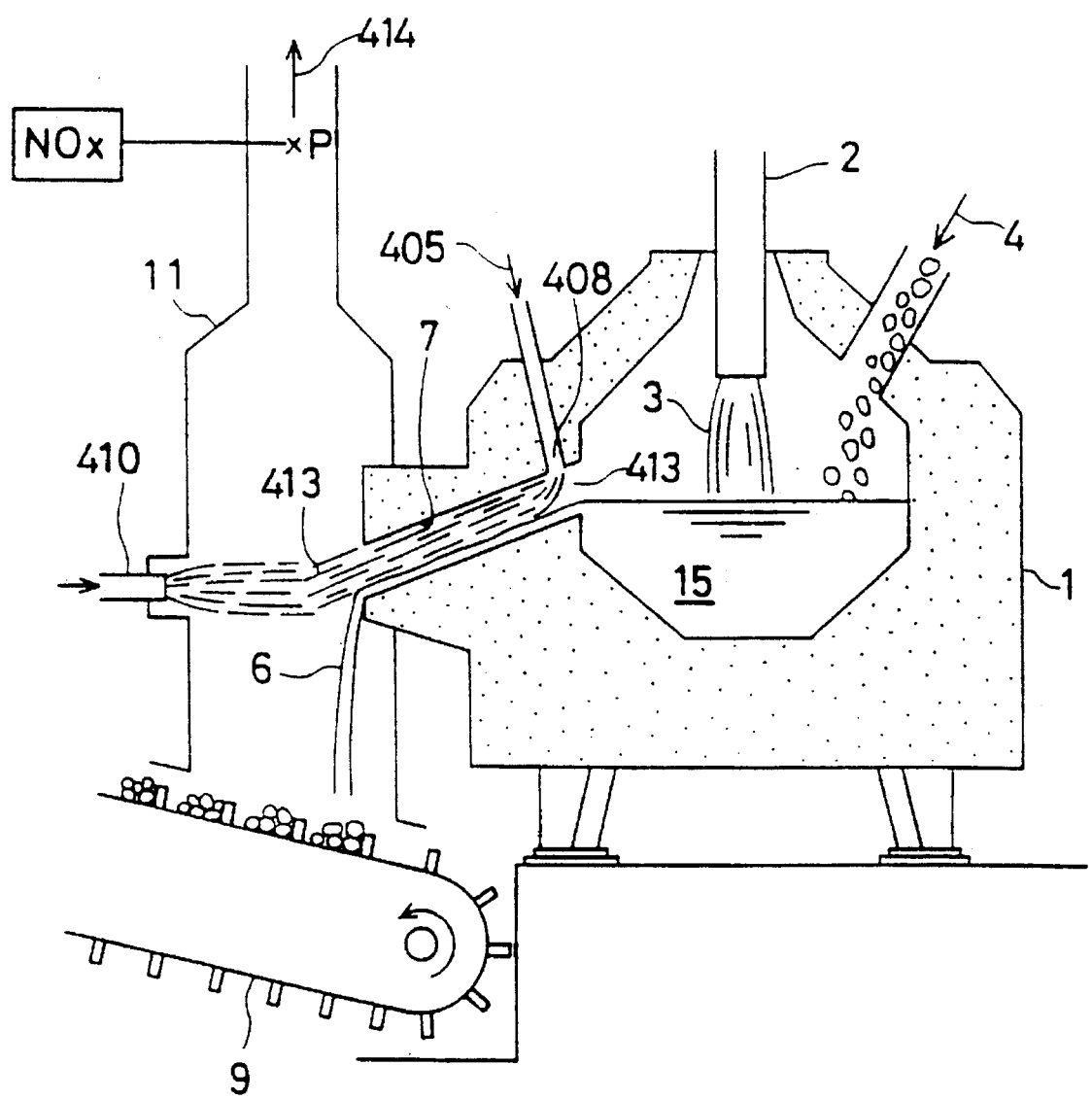
FIG. 11 is a schematic illustration to help explain another method of operating the plasma furnace with a view to decreasing the amount of $NO_x$.

FIGS. 9 to 11 illustrate a method of operating the plasma furnace with a view to decreasing the amount of $NO_x$.

Referring now to FIG. 9, waste gas 413 which has just been discharged from the furnace body 1 is converted into purified waste gas 414 during and after passage through a waste gas outlet 416. The purified waste gas 414 is discharged into the open air after passage through the flue 11 and a dust catcher (not shown). A fuel inlet 408 is provided at the entrance to the waste gas outlet 416. A requirement to be met by fuel for use in this embodiment is that the fuel should be capable of being injected. Thus, gaseous fuel (such as city gas or butane) or liquid fuel (such as kerosene or fuel oil A) may be used as fuel 405 for decreasing the amount of $NO_x$. The fuel 405 is injected against the waste gas 413 through the fuel inlet 408, uniformly mixed with the waste gas 413, and subjected to combustion. A major portion of the waste gas 413 is converted into reducing gas by which $NO_x$ is reduced. In view of the fact that the reducing gas may possibly still remain in the waste gas 413 passing through the waste gas outlet 416, an air nozzle 410 having an opening in the flue 11 is provided so that a jet of combustion air issuing from the air nozzle 410 may be directed against the waste gas 413 passing through the flue 11 and the reducing gas remaining in the waste gas 413 is subjected to complete combustion. Purified waste gas 414 is discharged into the open air after passage through the flue 11 and a dust catcher (not shown).

Various types of plasma torches 2 and various kinds of plasma gases such as Ar, $N_2$ and air are available. Air is widely used, because it is the most inexpensive plasma gas. The trouble is that $N_2$ and $O_2$ contained in air act upon each other in a high-temperature plasma arc and produce $NO_x$ in high concentrations, to which the causes of photochemical smog and acid rain can be attributed. Gaseous or liquid fuel 405, preferably the former, is injected against the waste gas 413 through the fuel inlet 408 and uniformly mixed with the waste gas 413 which contains $NO_x$. A major portion of the waste gas 413 is converted into reducing gas and subjected to combustion. $NO_x$ is reduced by this reducing gas and diminishes in quantity. When air is used as plasma gas, the quantity of air to be injected per unit time is 10 to 30 $Nm^3/h$ in case of an output power of 300 kW, and 80 to 120 $Nm^3/h$ in case of an output power of 1.5 MW. When the waste 4 does not contain combustibles, the concentration of $O_2$ in the waste gas 413 is about 21%. The quantity of gaseous or liquid fuel 405 to be injected per unit time should be determined so that an optimum quantity of reducing gas for decreasing the quantity of $NO_x$ may be produced. For this reason, in determining the quantity of gaseous or liquid fuel 405 to be injected per unit time, the quantity of the waste gas 413 and the concentration of $O_2$ therein should be taken into account. When city gas 13A is used, the quantity of this gaseous fuel to be injected per unit time is no more than 1 to 3 $Nm^3/h$ in case of an output power of 300 kW, and 8 to 12 $Nm^3/h$ in case of an output power of 1.5 MW. In case where the waste 4 contains combustibles, a smaller quantity of city gas will be enough, because in this case a larger quantity of $O_2$ contained in the air used as plasma gas is consumed than in case where the waste 4 does not contain combustibles. Since there is no possibility that the city gas issuing from the fuel inlet 408 flows backward to the interior of the furnace body 1, there is no possibility either that harmful matter such as CO gets mixed with the waste gas 413 leaking through a gap between the furnace body 1 and the plasma torch 2.

Preferably, the fuel inlet 408 is provided at the entrance to the waste gas outlet 416 as shown in FIG. 9 so that the fuel 405 injected toward the waste gas 413 may get mixed well with the waste gas 413 so as to be suited to the combustion. Alternatively, the fuel inlet 408 may have an opening in the flue 11. The temperature of the waste gas 413 in the vicinity of the downstream end of the fuel inlet 408 has only to be higher than the ignition temperature of the fuel 405 involved. Thus a temperature above 500° C. is preferable. In order to obtain an effect of decreasing the quantity of $NO_x$ without fail, it is most common to supply more fuel 405 than actually required for consuming residual $O_2$. The surplus fuel 405 produces reducing gases such as CO and $H_2$, which should be subjected to complete combustion in the flue 11. A jet of combustion air issuing from the air nozzle 410 serves for this purpose. In order that the concentration of CO in the waste gas 414 discharged into the open air may be held down below 100 ppm, the waste gas 413 in the vicinity of the nozzle tip of the air nozzle 410 should be held at a temperature above 800° C.

The ultrahigh-temperature plasma arc 3 is apt to oxidize the electrode disposed in the plasma torch 2. In order to allow the plasma torch 2 to stand long use, the quantity of air injected per unit time is subjected to a periodic change, which causes the arc end of the ultrahigh-temperature plasma arc 3 to move on the electrode surface and thereby causes the electrode wear to be made uniform so as to allow the electrode to stand long use. In order to keep the furnace atmosphere constantly reducing, it is most common to add carbonaceous matter to the waste 4. Since the carbonaceous matter takes the form of amorphous solids, it takes time for them to be melted and gasified into reducing gases. Furthermore, there is a wide difference in the rate of gasification according to the kinds or sizes of the amorphous solids. This is the very reason why a large quantity of carbonaceous matter is required for keeping the furnace atmosphere constantly reducing. The larger the quantity of carbonaceous matter, the longer the response time of the plasma furnace to a necessity for decreasing the quantity of $NO_x$. The present invention solves this problem in a simple and efficient manner by using gaseous fuel 405 such as city gas containing reducing gases. Thus the fuel 405 used in the present invention has a significantly great effect of reducing $NO_x$ and decreasing the quantity thereof as soon as a small quantity of the fuel 405 is injected toward the waste gas 413. Furthermore, the fuel 405 used in the present invention is convenient to handle such that the quantity of the fuel 405 injected per unit time can be varied with a periodic change in the quantity of plasma gas injected per unit time so that the quantity of reducing gases produced may be suited for holding down the quantity of $NO_x$ produced.

The following specific example will serve to illustrate the above-described embodiment. The incineration residue of municipal refuse was fed to the plasma furnace shown in FIG. 9 at the rate of 250 kg an hour. The output power used for melting the incineration residue by means of the plasma torch 2 of nontransfer type was 300 kW. Air was used as plasma gas, and the quantity of air injected per unit time was 21 $Nm^3/h$ on an average, from which the quantity of air did not vary more than plus or minus 20% all through the periodic change.

FIG. 10(a) illustrates the relationship between the amount of fuel injected toward the waste gas and the concentration of CO resulting therefrom. FIG. 10(b) illustrates the relationship between the amount of fuel injected toward the waste gas and the rate of decrease of $NO_x$. City gas 13A (consisting of 88% methane, 6% ethane, 4% propane and 2% butane) was used as the fuel 405, which was injected toward the waste gas 413 through the fuel inlet 408. When the city gas was injected at the rate of 1 $Nm^3/h$, the concentration of CO in the waste gas 413 was below 100 ppm and the rate of decrease of $NO_x$ was about 46%. When the amount of city gas injected per unit time was increased from 2 $Nm^3/h$ to 4 $Nm^3/h$, an increase in the concentration of CO was observed as indicated by a curve (A) in FIG. 10(a) and the rate of decrease of $NO_x$ also came up to about 90%. In order to decrease the concentration of CO, the open air was drawn into the flue 11, and yet the concentration of CO was rather high. Therefore, a jet of combustion air issuing from the air nozzle 410 was directed at the rate of 20 to 30 $Nm^3/h$ against the waste gas 413 passing through the flue 11. The result was that the concentration of CO in the waste gas 414 discharged into the open air was lower than 100 ppm as illustrated by the dashed line (B) in FIG. 10(a), while the rate of decrease of $NO_x$, i.e. 90 to 92%, remained substantially unchanged as shown by the dashed line (B) in FIG. 10(b).

The furnace body 1 shown in FIG. 11 is different in construction from that shown in FIG. 9. The point of difference resides in the fact that, in case of the embodiment shown in FIG. 11, the slag outlet 7 also serves as an outlet for discharging the waste gas 413. The fuel inlet 408 for injecting the fuel 405 is provided at the entrance to the slag outlet 7. In the same manner as mentioned in reference to the embodiment shown in FIG. 9, a major portion of the waste gas 413 is converted into reducing gas by which the amount of $NO_x$ is decreased. At the same time, the high-temperature waste gas 413 is allowed to heat the slag 6 in the slag outlet 7 so that the discharge of the molten slag 6 may be stabilized.

Ordinarily, the amount of waste gas discharged from the plasma furnace is less than one-thirtieth of the amount of waste gas discharged from a combustion furnace. Such a small amount of waste gas makes it difficult to keep the downstream end of the slag outlet 7 of the plasma furnace and its vicinity at a high temperature. Consequently, the molten slag 6 is apt to be solidified at the downstream end of the slag outlet 7 and hindered from flowing out. If this happens, the furnace pressure will increase to such an uncontrollable extent that the particles of soot suspended in the furnace body 1 will be discharged into the open air and bring about environmental pollution. The present invention solves this problem by injecting the fuel 405 through the fuel inlet 408 and allowing the fuel 405 to be mixed well with the waste gas 403 in the confined space of the slag outlet 7 and subjected to combustion. Intense heat generated thereby serves to keep the whole reach of the slag outlet 7 at a high temperature. The downstream end of the slag outlet 7 and its vicinity are also held at a high temperature, and the slag outlet 7 is prevented from being choked up. The location of the fuel inlet 408 at the entrance to the slag outlet 7 also serves to keep the whole reach of the slag outlet 7 at a high temperature.

The following specific example will serve to illustrate the above-described embodiment. The incineration residue of municipal refuse was fed to the plasma furnace shown in FIG. 11 at the rate of 300 kg an hour. The output power used for melting the incineration residue by means of the plasma torch 2 of nontransfer type was 300 kW. The quantity of plasma gas injected per unit time was subjected to a periodic change with a period of 3 minutes and within the range between 15 $Nm^3/h$ and 25 $Nm^3/h$. Combustion air was injected through the air nozzle 410 at the rate of 20 $Nm^3/h$ for the purpose of burning the unburnt gas in the flue 11 and thereby inhibiting CO from being discharged into the open air. The aforesaid city gas 13A was injected through the fuel inlet 408 at the rate of 3.0 $Nm^3/h$, and a mean value of 93.7% was obtained from the rates of decrease of $NO_x$ obtained in the course of an hour. From the foregoing, it will be noted that the city gas was injected at the constant rate while the quantity of plasma gas injected per unit time was subjected to a periodic change. The result was that the percent reduction and the rate of decrease of $NO_x$ were subject to sharp variation with time such that they were low when the quantity of plasma gas injected per unit time was large while they were high when the quantity of plasma gas injected pep unit time was small. In order to cope with this sharp variation, the quantity of city gas injected per unit time through the fuel inlet 408 was also subjected to a periodic change such that the mean value of the quantities of city gas injected per unit time in the course of an hour was 3.0 $Nm^3/h$. The periodic change of the quantity of city gas was synchronized with the periodic change of the quantity of plasma gas, and a mean value of 96.2% was obtained from the rates of decrease of $NO_x$ obtained in the course of an hour. In a control test conducted under the condition that the city gas was not injected into the slag outlet 7, the molten slag 6 was solidified at the downstream end of the slag outlet 7 and maintenance work had to be done at intervals of about 5 hours. When the city gas was injected into the slag outlet 7, the aforesaid problem was solved and the necessity for maintenance work was obviated. Because of the stabilized discharge of the high-temperature molten slag 6, the quality of the slag 6 was improved to such a significant degree as to be suited for use, e.g., as aggregate to be mixed with concrete.

In brief, an important feature of the aforesaid two embodiments is that the fuel is injected against the waste gas and converted into reducing gases so that $NO_x$ contained in the waste gas may be reduced thereby. Thus the fuel is so effectively utilized for reduction that a small quantity of the fuel is enough to decrease the quantity of $NO_x$. Gaseous or liquid fuel, which is capable of being injected, is more convenient to handle than solid fuel. The periodic change of the quantity of fuel can be synchronized with the periodic change of the quantity of plasma gas so that reducing gases may be produced neither too much nor too less. Since the interior of the furnace body is not filled with reducing gases, there is little possibility that the waste gas leaking out of the furnace body contains harmful matter. In one of the aforesaid two embodiments, the fuel is injected into, and subjected to combustion in, the slag outlet which also serves as an outlet for discharging the waste gas. The slag outlet heated thereby serves to stabilize the discharge of the molten slag.

Figure 12:
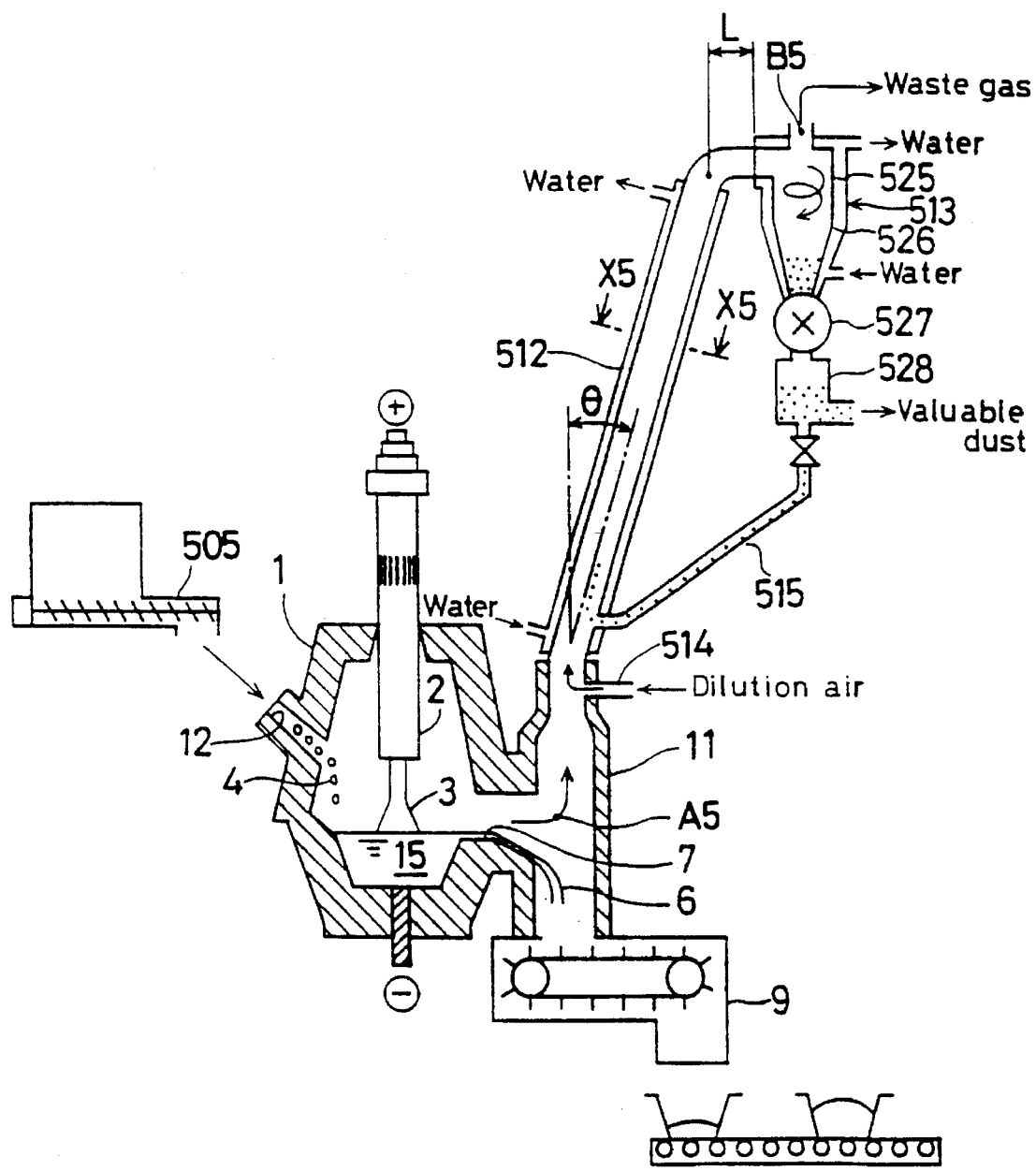
FIG. 12 is a schematic illustration to help explain the structural construction of a device for recovering valuable matter from the waste gas.
Figure 13:
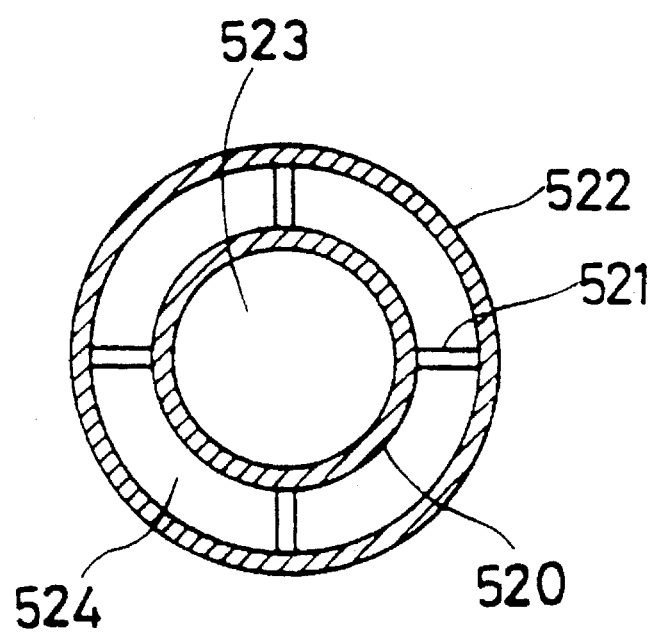
FIG. 13 is a cross section taken along line X5—X5 of FIG. 12.
Figure 14:
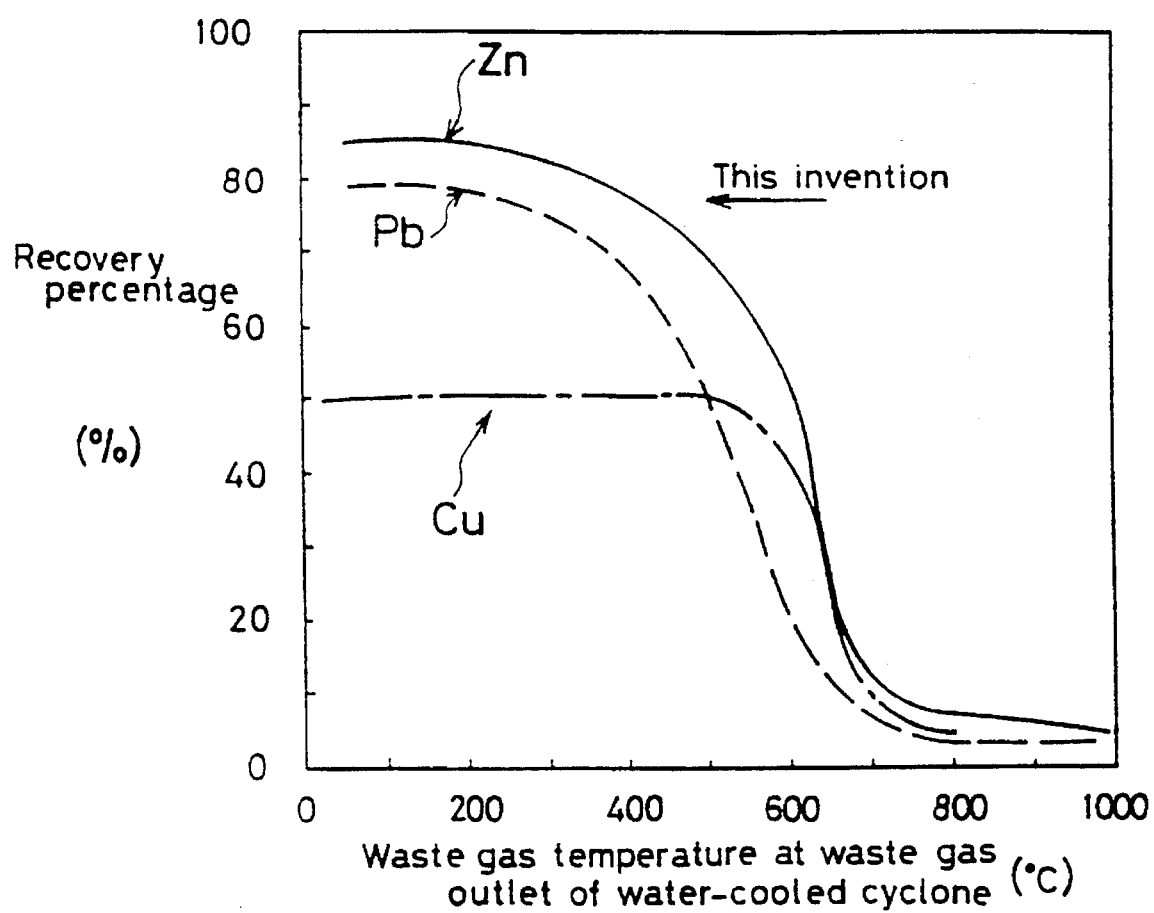
FIG. 14 illustrates the relationship between the temperature of the waste gas at the outlet of the water-cooled cyclone and the percentage of recovery of valuable matter.

FIGS. 12 to 14 help explain a device for, and a method of, recovering valuable matter from the waste gas.

Referring now to FIG. 12, the waste gas results from high-temperature plasma gas produced by the plasma arc 3 and flows through the slag outlet 7 into the flue 11 (which serves as a secondary combustion chamber) as indicated by an arrow. This waste gas contains low-melting-point matter in a vaporized state. The temperature at point A5 is as high as about 1300° C. The waste gas flows through a water-cooled pipe 512 into a water-cooled cyclone 513, in which the separation of valuable dust from the waste gas is accomplished. A dilution air pipe 514 is connected to the downstream portion of the flue 11. A dust circulating line 515 is connected to the upstream portion of the water-cooled pipe 512.

As shown in FIG. 13, the water-cooled pipe 512 consists of a larger diameter pipe 522 arranged around a smaller diameter pipe 520 which defines a waste gas channel 523. Both pipes are rigidly secured to each other by means of spacers 521 so as to define a cooling water channel 524 therebetween. In FIG. 12, the water-cooled pipe 512 makes an angle of θ with a vertical axis. Preferably, θ assumes a value of zero, which means that the water-cooled pipe 512 extends vertically. However, angling forward at less than 30° to a vertical axis is allowable when the water-cooled pipe 512 cannot be allowed to extend vertically for some reason or other. Even if some dust sticks to the inner surface of the water-cooled pipe 512 to the extent of forming a sedimentary layer, the pipe which angles forward at less than 30° to a vertical axis allows the sedimentary layer to be spontaneously stripped from the inner surface of the pipe when the sedimentary layer has come to have a thickness of about 1 to 2 mm. As long as the value of θ falls within the limit of 30°, the accumulation of dust on the inner surface of the water-cooled pipe 512 does not cause a serious trouble. The length L of a horizontal transition section from the water-cooled pipe 512 to the water-cooled cyclone 513 should preferably be short in so far as possible.

The water-cooled cyclone 513 includes a jacket 526 disposed circumferentially around a vessel 525. A whirlwind is caused in the vessel 525, the bottom part of which forms a hopper for collecting the dust to be dropped to a box 528 through a rotary joint 527. The waste gas, from which the separation of valuable dust has been accomplished, flows away through a waste gas outlet disposed at the top of the vessel 525. A portion of the valuable dust admitted into the box 528 is fed back to the upstream portion of the water-cooled pipe 512 through the dust circulating line 515. Because of this feedback, the concentration of valuable dust in the waste gas can be raised to such an extent that, e.g., the concentration of Zn becomes 2 to 3 times as high as an initial value.

For the collection of valuable dust, it is important to cool the waste gas in the pipe 512 and the cyclone 513 to such an extent that the temperature of the waste gas at the outlet of the water-cooled cyclone 513 is lowered below 650° C. The air supplied by the dilution air pipe 514 connected to the downstream portion of the flue 11 has an effect of quickly lowering the temperature of the waste gas at the entrance to the water-cooled pipe 512 and thereby coagulating the volatilized valuable matter as will appear hereinafter.

Reference will now be specifically made to how the valuable matter is recovered from the waste gas by means of the above-described device. Most of the low-melting and low-boiling valuable matter such as Pb and Zn is vaporized and dispersed into waste gas as submicron particles in the furnace body. These particles are cooled as the waste gas is cooled. While they condense, they coagulate with each other. This coagulation makes the size of the resultant dust large enough to be collected by the water-cooled cyclone 513. The nuclei of the resultant dust are particles which have failed to be converted into slag in the furnace body and have particle sizes ranging from several μm to several tens of μm. An increase in the flow velocity of the waste gas relative to that of the valuable particles and/or in the flow velocity of one valuable particle relative to that of another is caused by the water-cooled pipe 512 which angles forward at less than 30° to a vertical axis. While the submicron particles are cooled, they collide with and stick to the aforesaid nuclear particles. The particle size grows larger every time the collision occurs. The valuable matter is gradually enriched. The feedback of a portion of the valuable matter to the upstream portion of the water-cooled pipe 512 through the dust circulating line 515 serves to further enrich the valuable matter.

Comparatively high-melting and comparatively high-boiling valuable matter such as Cu is vaporized in the area where such valuable matter is directly heated by a plasma arc having a temperature above 3000° C. Such valuable matter is not vaporized in the remaining area but is sealed in the slag. Thus, only the vaporized valuable matter of this kind is recovered. Ultrahigh-melting and ultrahigh-boiling metals such as titanium is not vaporized, but most of them are sealed in the slag and rendered unrecoverable.

The following specific example will serve to illustrate the above-described embodiment. The incineration residue of municipal refuse (containing 0.8% Zn, 0.4% Pb and 0.6% Cu) was fed to the plasma furnace shown in FIG. 12 at the rate of 300 kg an hour. The output power used for melting the incineration residue by means of the plasma torch 2 of transfer type was 300 kWh. Air was used as plasma gas.

FIG. 14 illustrates typical test results with different temperatures of the waste gas at the waste gas outlet of the water-cooled cyclone 513. These different temperatures were obtained from different quantities of dilution air injected into the flue 11 through the dilution air pipe 512 per unit time. At temperatures below 650° C., large percentages of recovery of low-melting and low-boiling Zn and Pb were obtained. This is because most of Zn and Pb are vaporized and dispersed into waste gas in the furnace body 1. They are coagulated so as to be collected by the water-cooled cyclone 513 when the waste gas at the waste gas outlet of the water-cooled cyclone 513 is held at temperatures below 650° C. As for comparatively high-melting and comparatively high-boiling Cu, it should be noted that, since a fair amount of Cu is sealed in the slag, the percentage of recovery of Cu peaks out at about 50% even at temperatures below 650° C.

In brief, an important feature of the aforesaid embodiment is that the size of particles of low-melting matter such as Pb, Zn and Cu is made larger as these particles are carried up through a riser. Thus the particles are adapted to be efficiently collected as valuable dust and recycled as resources. There is no possibility that they choke up a waste gas channel in a waste gas purifying plant or that submicron particles are discharged into the open air and cause harm to the public.

FIGS. 15 to 20 help explain two examples of the device for monitoring the condition of the plasma torch 2 during operation.

This device comprises a pressure sensor 604 provided in the wall of the furnace body 1, a voltage sensor 605 provided in a power unit 603 for the plasma torch 2, integrating means 606 provided in an operation control box 611, first comparator means 607, second comparator means 608 and discriminating means 609.

Figure 16A:
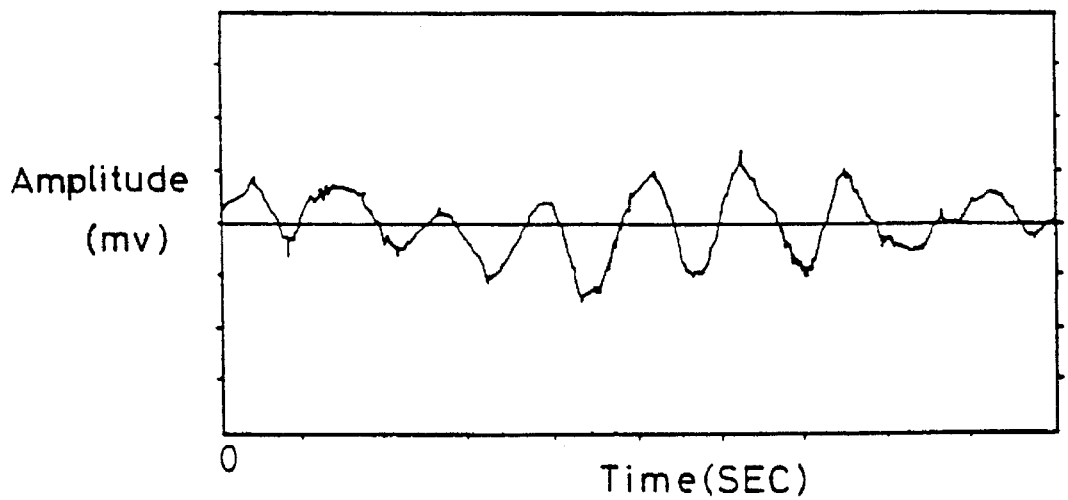
FIGS. 16(a) and 16(b) illustrate signal waveforms obtained from a pressure sensor for detecting a variation in the furnace pressure or in the supply pressure of plasma gas.
Figure 16B:
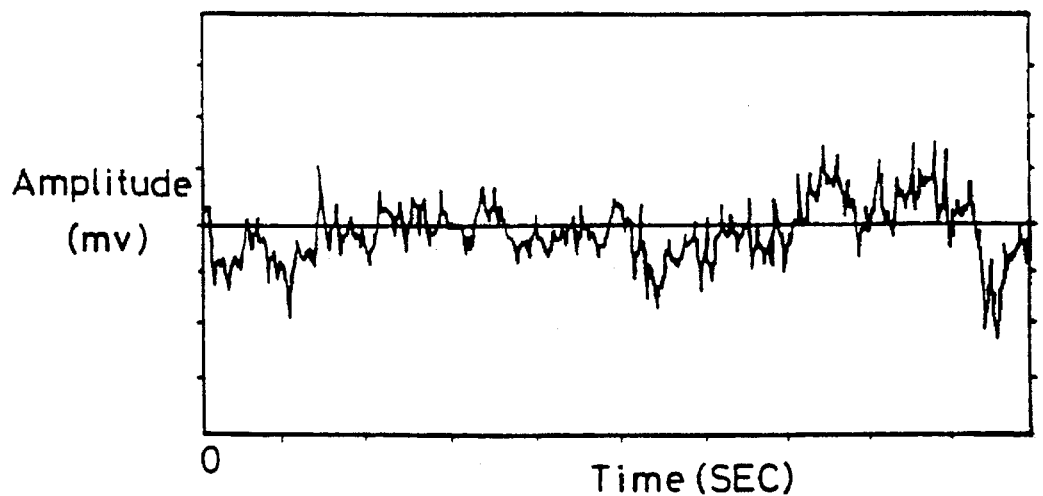

The pressure sensor 604 detects a variation in the furnace pressure caused by the leakage of cooling water out of the plasma torch 2. The waveforms of output signals taken from the pressure sensor 604 and fed to the integrating means 606 are shown in FIGS. 16(a) and 16(b). The waveform shown in FIG. 16(a) indicates that the plasma torch 2 is under the normal condition, while the waveform shown in FIG. 16(b) indicates that coolig water is leaking out of the plasma torch 2.

Figure 17A:
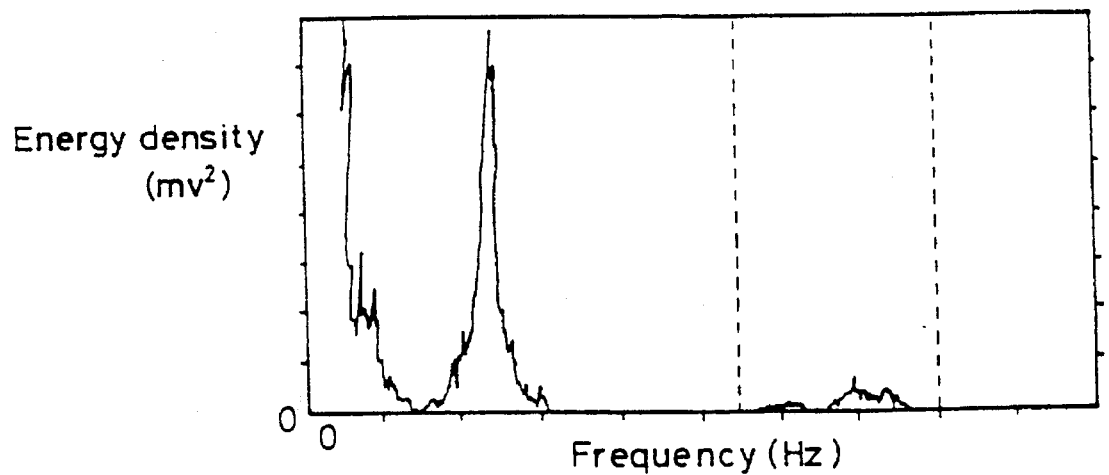
FIG. 17(a) illustrates a frequency range in which the signal waveform indicating the normal condition of the plasma torch appears.
Figure 17B:
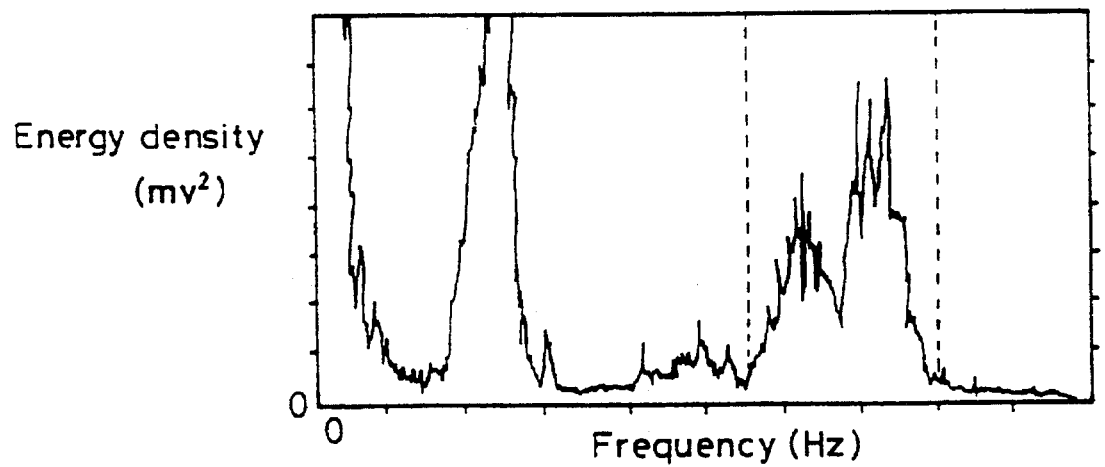
FIG. 17(b) illustrates another frequency range in which the turbulence of the signal waveform caused by the leakage of cooling water out of the plasma torch appears.

The integrating means 606 receives signals from the pressure sensor 604 through a band-pass filter 606a, which separates specific frequency bands from the waveform of the output signal taken from the pressure sensor 604. These specific frequency bands are subjected to power spectral integral (hereinafter called "spectral integral" for short). Values obtained from the spectral integral are fed to the first comparator means 607. The reason for separating specific frequency bands from the waveform of the output signal taken from the pressure sensor 604 and subjecting them to spectral integral is that the turbulence of the signal waveform caused by the leakage of cooling water out of the plasma torch 2 appears in a different frequency range from that in which the signal waveform indicating the normal condition of the plasma torch 2 appears. FIG. 17(a) illustrates a frequency range in which the signal waveform indicating the normal condition of the plasma torch 2 appears. FIG. 17(b) illustrates another frequency range in which the turbulence of the signal waveform caused by the leakage of cooling water out of the plasma torch 2 appears.

Figure 18:
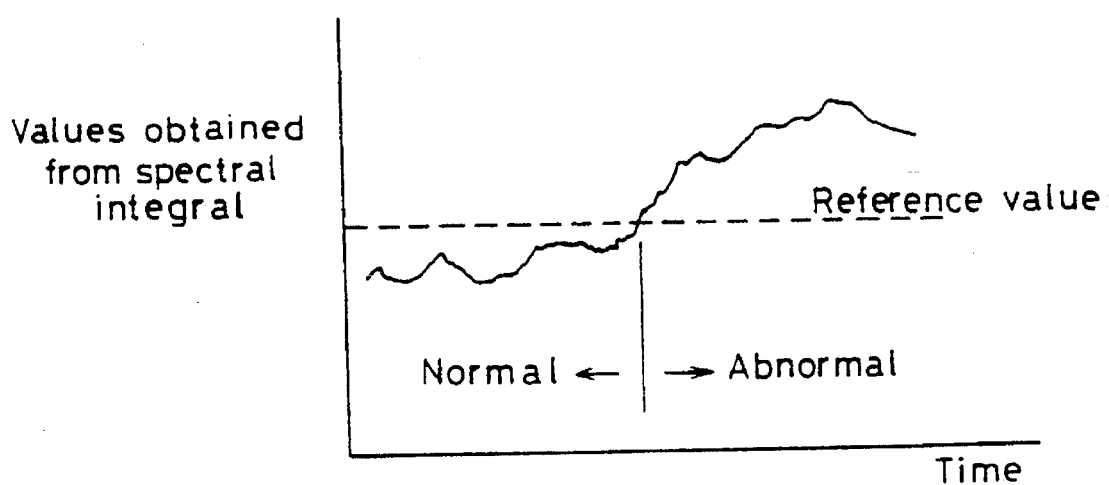
FIG. 18 illustrates a criterion for judging the plasma torch to be abnormal on the basis of values obtained from spectral integral.

In the first comparator means 607, the values obtained from the spectral integral in the integrating means 606 are compared with a first prescribed reference value. When the former values are greater than the latter value, the first comparator means 607 generates an abnormality indicating signal to be fed to the distinguishing means 609. The first prescribed reference value is shown in FIG. 18. In order to define this reference value, a signal waveform obtained from the pressure sensor 604 under the normal condition of the plasma torch 2 in the frequency range in which the turbulence of the signal waveform is to appear when cooling water begins to leak out of the plasma torch 2 is subjected to spectral integral. The first prescribed reference value is defined as a value obtained from this spectral integral.

Figure 19:
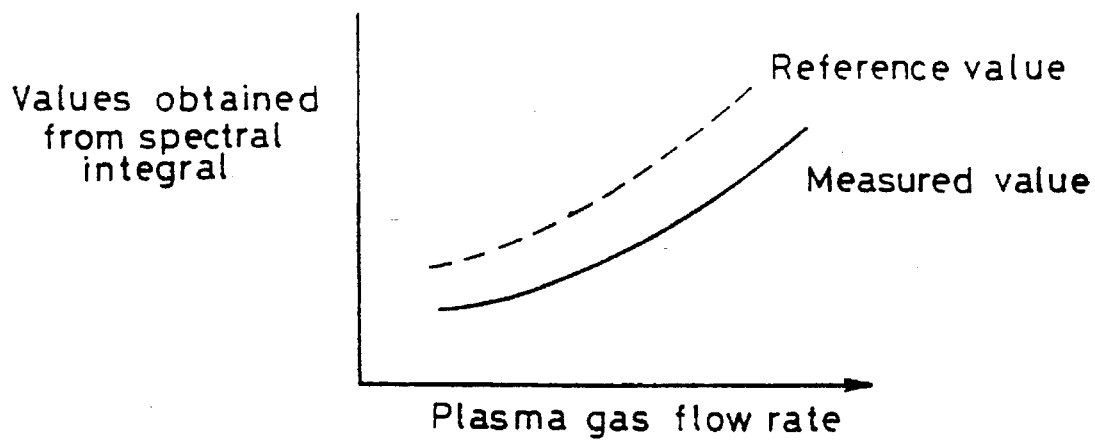
FIG. 19 illustrates how a reference value to be used as the criterion is set for each flow rate of plasma gas.

The value obtained from the aforesaid spectral integral to define the first prescribed reference value varies with the quantity of plasma gas injected from the plasma torch 2 per unit time as indicated by a solid curve in FIG. 19. Therefore, the aforesaid first prescribed reference value is set as a value variable with the quantity of plasma gas injected per unit time as indicated by a dashed curve in FIG. 19.

The voltage sensor 605 detects a variation in supply voltage for the plasma torch 2. In the second comparator means 608, an output signal taken from the voltage sensor 605 is compared with a second prescribed reference value. When a drop in the supply voltage is detected as a result of this comparison, the second comparator means 608 generates a voltage drop indicating signal to be fed to the discriminating means 609. The provision of the voltage sensor 605 is based on the fact that the leakage of cooling water out of the plasma torch 2 is always accompanied by a drop in the supply voltage for the plasma torch 2. For the purpose of preventing the malfunction of the aforesaid device for monitoring the condition of the plasma torch 2 during operation, the construction of the discriminating means 609 is such that it judges the plasma torch 2 to be abnormal if and only if the first and second comparator means 607 and 608 exhibit a specific combination of output states.

According to a combination of output states to be exhibited by the first and second comparator means 607 and 608, the discriminating means 609 generates a signal to be fed either to the power unit 603 to break the circuit to the plasma torch 2 or to an alarm lamp 610. FIG. 21 illustrates an example of the combinations of such output states. An abnormality indicating signal and a voltage drop indicating signal generated simultaneously with each other by the first and second comparator means 607 and 608 indicate that the plasma furnace is in a dangerous state because of a large quantity of cooling water leaking out of the plasma torch 2. In this event, the discriminating means 609 generates a signal to be fed to the power unit 603 to break the circuit to the plasma torch 2. When an abnormality indicating signal is generated by the first comparator means 607 while a voltage drop indicating signal is not generated by the second comparator means 608, these output states indicate that the plasma torch 2 must be suspected of the leakage of cooling water. In this event, the discriminating means 609 generates a signal to be fed to the alarm lamp 610, which calls the workers' attention to the doubtful plasma torch 2. The operation of the plasma torch 2 is continued when neither an abnormality indicating signal nor a voltage drop indicating signal is generated by the first or second comparator means 607 or 608.

In operation, when cooling water begins to leak out of the plasma torch 2, the pressure sensor 604 detects a variation in the furnace pressure caused by the leakage. The voltage sensor 605 detects a variation in supply voltage for the plasma torch 2. In the integrating means 606, specific frequency bands separated from the waveform of the output signal taken from the pressure sensor 604 are subjected to spectral integral. In the first comparator means 607, the values obtained from the spectral integral in the integrating means 606 are compared with a first prescribed reference value. When the former values are greater than the latter value, the first comparator means 607 generates an abnormality indicating signal. In the second comparator means 608, an output signal taken from the voltage sensor 605 is compared with a second prescribed reference value. A drop in the supply voltage may be detected as a result of this comparison. The discriminating means 609 judges the plasma torch 2 to be abnormal and generates a signal to break the circuit to the plasma torch 2 when the discriminating means 609 has received both an abnormality indicating signal and a voltage drop indicating signal from the first and second comparator means 607 and 608 respectively.

Figure 20:
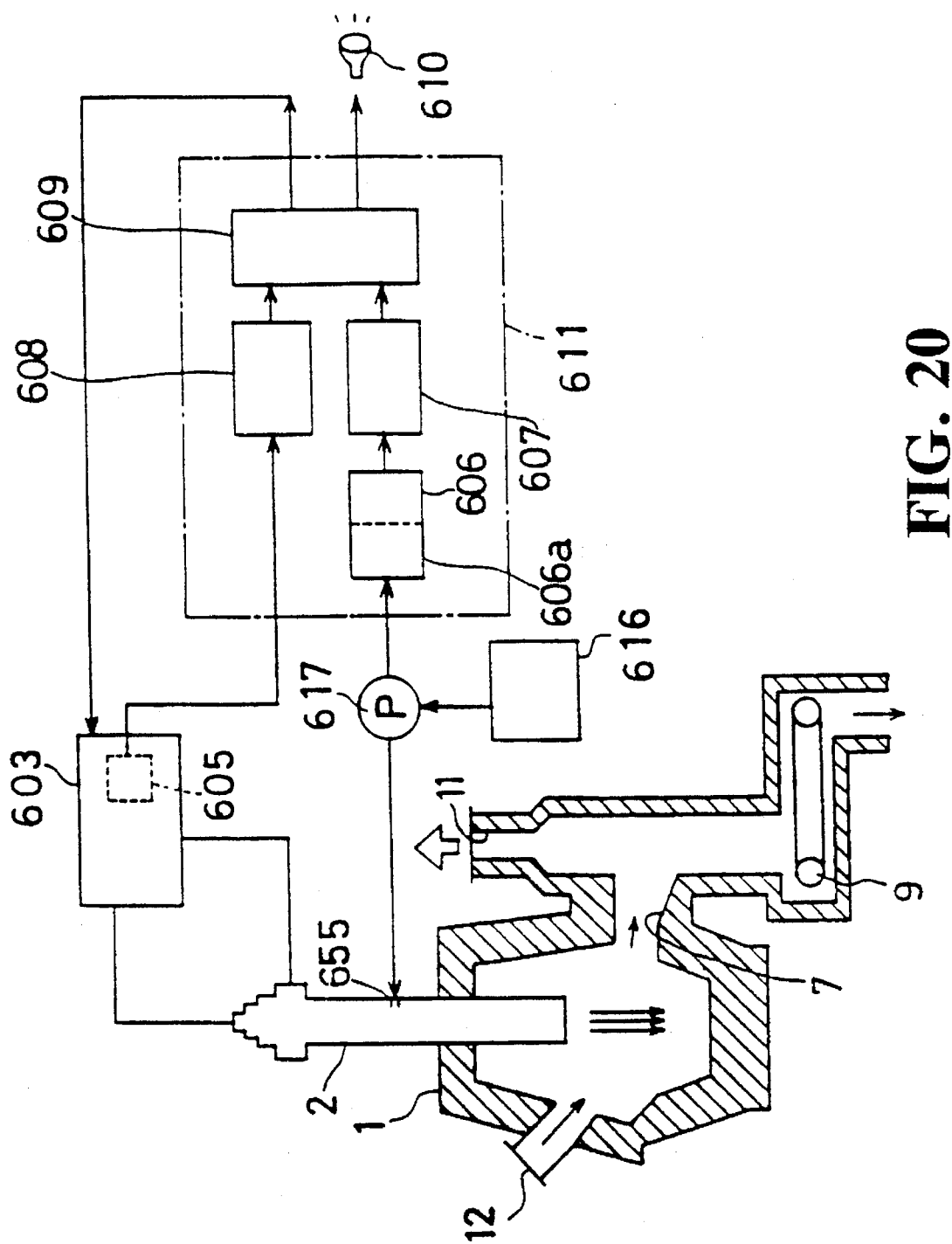
FIG. 20 is a schematic illustration to help explain another example of the device for monitoring the condition of the plasma torch during operation.
Figure 22A:
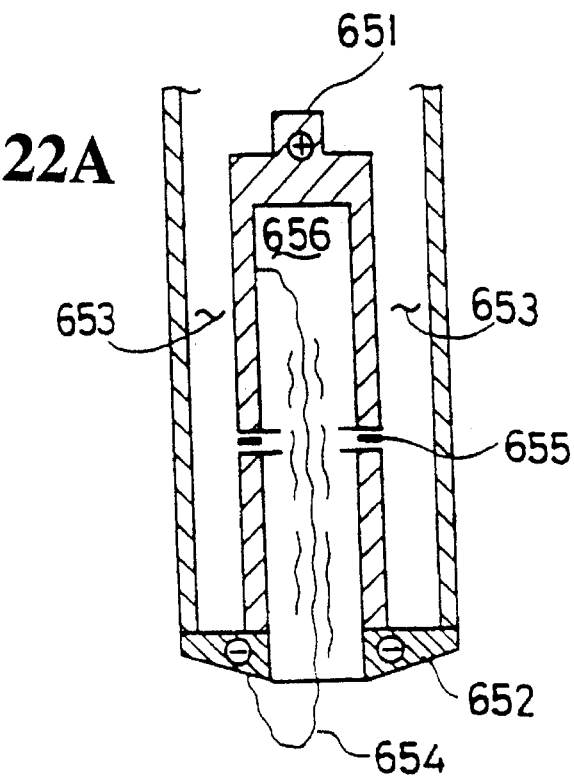
FIGS. 22(a) and 22(b) are sectional views illustrating the main parts of two types of plasma torches respectively.
Figure 22B:
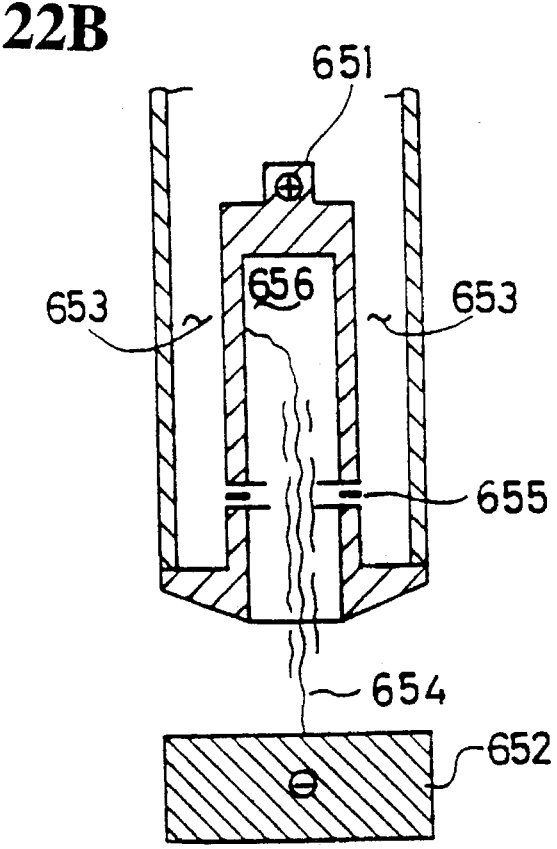

FIG. 20 helps explain another example of the device for monitoring the condition of the plasma torch 2 during operation. As shown in FIGS. 22(*a*) and 22(*b*), the plasma torch 2 includes a downwardly opening cylinder by which a space 656 is defined. The downwardly opening cylinder is closed at its upper end upon which an electrode is placed. When cooling water leaks out of the plasma torch 2, water vapor pressure is built up in the space 656. A variation in the water vapor pressure in the space 656 can be detected in terms of a variation in the supply pressure of plasma gas. Thus an important feature which distinguishes this embodiment from that shown in FIG. 15 is that the leakage of cooling water out of the plasma torch 2 is not detected in terms of a variation in the furnace pressure but detected in terms of a variation in the supply pressure of plasma gas.

Figure 15:
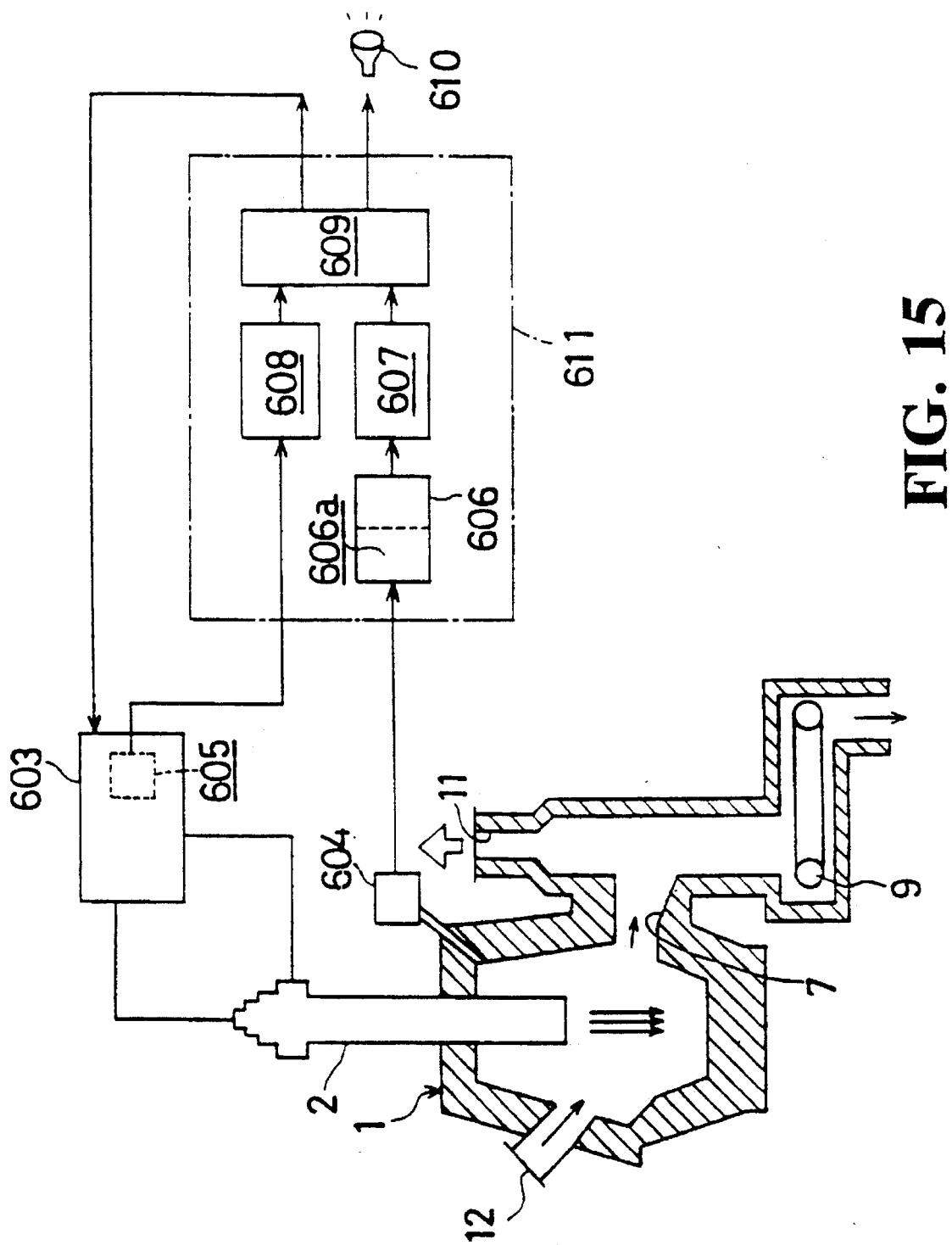
FIG. 15 is a schematic illustration to help explain an example of the device for monitoring the condition of the plasma torch during operation.

The aforesaid feature which distinguishes this embodiment from that shown in FIG. 15 is materialized by a pressure gauge 617 interposed between a plasma gas feeder 616 and the plasma torch 2. A signal waveform obtained from the pressure gauge 617 is similar to, and can be processed in the same manner as, the signal waveform obtained from the pressure sensor 604 shown in FIG. 15, except that frequency bands to be subjected to spectral integral are different from those subjected to spectral integral in the embodiment shown in FIG. 15 and that the values obtained from the spectral integral have to be compared with a different reference value. The discriminating means 609 judges the plasma torch 2 to be abnormal and generates a signal to break the circuit to the plasma torch 2 when the discriminating means 609 has received both an abnormality indicating signal and a voltage drop indicating signal from the first and second comparator means 607 and 608 respectively.

Thus an abnormal condition occurring in the plasma torch 2 during operation can be immediately detected. The plasma furnace is secure from an explosion or the like which may be caused by an ejection of a large quantity of cooling water into the furnace body 1 if the plasma furnace is kept in operation while nobody becomes aware that the leakage of coolig water has been caused by the deterioration of the plasma torch.

FIELD OF INDUSTRIAL UTILIZATION

By means of the refractory guide chute, the flow of the high-temperature waste gas is directed downwardly so as to follow the down flow of the molten slag at the downstream end of the slag outlet. Thus the sensible heat of the high-temperature waste gas forcedly heats the molten slag and the downstream end portion of the slag outlet. Consequently, it becomes less possible for the slag outlet to be choked up by the solidification of the molten slag 6 in the downstream end portion of the slag outlet 7. Thus the present invention is highly effective for providing the plasma furnace with the stability of operation.

Assuming that the upstream end of the slag outlet is disposed at a horizontal distance of L from the downstream end of a waste inlet, a pivot, about which a plasma torch is tilted, is disposed at a horizontal distance of 0.2 L to 0.45 L from the downstream end of the waste inlet. Because of this arrangement, heat from a plasma arc is adapted to be radiated to the downstream end of the waste inlet and its vicinity so as to quickly melt the waste. When there are signs that the slag outlet is being choked up, the plasma torch is slightly tilted to the upstream end of the slag outlet. Thus the plasma torch 2 can meet occasional requirements for stabilizing the discharge of the molten slag 6 and improving the electric power consumption rate and the ratio of the amount of slag 6 to the amount of incineration residue fed to the plasma furnace.

The present invention is further characterized by providing a housing or jacket disposed circumferentially around an incineration residue feed pipe, inserted through the incineration residue inlet, and adapted to allow an annular gas curtain to issue therefrom, and by further providing a driving device for changing the inclination of the jacket, this driving device being associated with a tilting device for changing the inclination of the plasma torch so that, when the inclination of the plasma torch is changed by the tilting device, the inclination of the jacket may also be changed by the driving device. Gas, e.g. air, is delivered from the jacket and directed toward a reservoir of the molten slag in such a manner that the direction of radiation from the plasma torch and the direction of gas delivery from the jacket intersect substantially on the surface of the slag reservoir. Thus the incineration residue 4 is allowed to fall onto a high-temperature area of the surface of the slag reservoir. This arrangement serves to melt the incineration residue 4, convert it into molten slag 6 efficiently, and allow it to be discharged from the furnace at a constant rate.

The present invention is further characterized by providing a means for fuel injection against the waste gas in the furnace body 1, such arrangement being particularly suitable for decreasing the amount of $NO_x$.

Furthermore, the present invention makes it possible to efficiently recover valuable matter from the waste gas without causing a waste gas channel in a waste gas purifying plant to be choked up with the particles of valuable matter.

Lastly, the device for monitoring the condition of the plasma torch 2 during operation makes the plasma furnace secure from an explosion or the like which may be caused by an ejection of a large quantity of cooling water into the furnace body 1 if the plasma furnace is kept in operation while nobody becomes aware that the leakage of cooling water has been caused by the deterioration of the plasma torch.

We claim:

1. A plasma furnace comprising:

a furnace body allowing molten slag to stay therein;

a plasma torch mounted on said furnace body for striking a plasma arc against said molten slag while injecting plasma gas;

an inlet provided in said furnace body for supplying said furnace body with waste therethrough;

an outlet provided in said furnace body for allowing a portion of said molten slag to leave said furnace body therethrough;

a flue for carrying up waste gas therethrough when said waste gas has been discharged through said outlet together with said portion of said molten slag;

a pressure sensor for detecting a variation in furnace pressure or a variation in plasma gas supply pressure;

integrating means for separating specific frequency bands from a waveform of an output signal taken from said pressure sensor and subjecting said specific frequency bands to spectral integral; and comparator means for receiving values obtained from said spectral integral in said integrating means, comparing said values with a prescribed reference value, and generating an abnormality indicating signal when said values are greater than said prescribed reference value.

2. A plasma furnace as defined in claim 1, wherein said prescribed reference value varies with a variation in a flow of said plasma gas out of said plasma torch.

3. A plasma furnace comprising:

a furnace body allowing molten slag to stay therein;

a plasma torch mounted on said furnace body for striking a plasma arc against said molten slag while injecting plasma gas;

an inlet provided in said furnace body for supplying said furnace body with waste therethrough;

an outlet provided in said furnace body for allowing a portion of said molten slag to leave said furnace body therethrough;

a flue for carrying up waste gas therethrough when said waste gas has been discharged through said outlet together with said portion of said molten slag;

a pressure sensor for detecting a variation in furnace pressure or a variation in plasma gas supply pressure;

integrating means for separating specific frequency bands from a waveform of an output signal taken from said pressure sensor and subjecting said specific frequency bands to spectral integral;

a first comparator means for receiving values obtained from said spectral integral in said integrating means, comparing said values with a prescribed reference value, and generating an abnormality indicating signal when said values are greater than said prescribed reference value;

a voltage sensor for detecting a variation in supply voltage for said plasma torch;

a second comparator means for receiving an output signal taken from said voltage sensor, comparing said output signal with an additional prescribed reference value, and generating a voltage drop indicating signal when a drop in supply voltage is detected as a result of said comparison; and discriminating means for generating a signal to break a circuit to said plasma torch when both said abnormality indicating signal and said voltage drop indicating signal are received from said first mentioned comparator means and said second comparator means respectively.

* * * * *